United States Patent
Lancaster-Larocque et al.

(10) Patent No.: US 9,611,562 B2
(45) Date of Patent: Apr. 4, 2017

(54) SOLID STATE DEPOSITION FOR COSMETIC ENHANCEMENT OF ANODIZED FRICTION STIR PROCESSED PARTS

(71) Applicant: Apple Inc., Cupertino, CA (US)

(72) Inventors: Simon Regis Louis Lancaster-Larocque, Gloucester (CA); Collin D. Chan, Dublin, CA (US); Kenneth A. Ross, Granger, IN (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/277,528

(22) Filed: May 14, 2014

(65) Prior Publication Data

US 2014/0339093 A1  Nov. 20, 2014

Related U.S. Application Data

(60) Provisional application No. 61/825,483, filed on May 20, 2013, provisional application No. 61/825,988, filed on May 21, 2013.

(51) Int. Cl.
| | |
|---|---|
| *B23K 37/00* | (2006.01) |
| *C25D 11/02* | (2006.01) |
| *B23K 20/12* | (2006.01) |
| *C23C 24/04* | (2006.01) |
| *C25D 11/04* | (2006.01) |

(52) U.S. Cl.
CPC .......... *C25D 11/022* (2013.01); *B23K 20/122* (2013.01); *C23C 24/04* (2013.01); *C25D 11/04* (2013.01)

(58) Field of Classification Search
CPC .............................. B23K 37/00; C25D 11/022
USPC ................................................... 427/191, 192
See application file for complete search history.

(56) References Cited

U.S. PATENT DOCUMENTS

| | | | |
|---|---|---|---|
| 3,000,576 A * | 9/1961 | Levey ..................... | B05B 1/042 239/124 |
| 2007/0138235 A1 | 6/2007 | Kumagai et al. | |
| 2008/0003355 A1* | 1/2008 | Piton ..................... | B05D 5/005 427/140 |
| 2008/0047222 A1* | 2/2008 | Barnes ........................... | 52/693 |

(Continued)

FOREIGN PATENT DOCUMENTS

| | | |
|---|---|---|
| JP | 20110252275 | 2/2011 |
| TW | I335251 B | 1/2011 |

(Continued)

OTHER PUBLICATIONS

PCT/US2014/037985. Int'l Search Report & Written Opinion. Sep. 24, 2014.

(Continued)

*Primary Examiner* — Alexander Weddle
(74) *Attorney, Agent, or Firm* — Downey Brand LLP

(57) ABSTRACT

The described embodiments relate generally to methods to enhance cosmetic surfaces of friction stir processed parts. More specifically a method for applying cold spray over a weld line generated by the friction stir processing is disclosed. Methods are also disclosed for blending the cold spray applied over the weld line in with a cosmetic surface portion of friction stir processed parts. In some embodiments cold spray can be used to on its own to create a cosmetic join between various parts.

18 Claims, 22 Drawing Sheets

(56) References Cited

U.S. PATENT DOCUMENTS

2010/0089976 A1    4/2010  Szymanski et al.
2013/0029114 A1*  1/2013  Ozeki et al. ............... 428/195.1
2013/0292152 A1*  11/2013  Kayamoto et al. .......... 174/68.2

FOREIGN PATENT DOCUMENTS

| TW | I352640 B | 11/2011 |
| WO | WO 2012046352 A1 * | 4/2012 |
| WO | WO 2012093614 A1 * | 7/2012 |

OTHER PUBLICATIONS

Taiwanese Patent Application No. 103117518—Office Action dated Feb. 24, 2016.

* cited by examiner

SOLID STATE DEPOSITION FOR COSMETIC ENHANCEMENT OF ANODIZED FRICTION STIR PROCESSED PARTS

CROSS-REFERENCE TO RELATED APPLICATIONS

This application claims priority to U.S. Provisional Application No. 61/825,483 filed May 20, 2013, entitled "Solid State Deposition For Cosmetic Enhancement Of Anodized Friction Stir Processed Parts," and to U.S. Provisional Application No. 61/825,988 filed May 21, 2013, entitled "Solid State Deposition For Cosmetic Enhancement Of Anodized Friction Stir Processed Parts." which are incorporated herein by reference in their entirety.

FIELD

The described embodiments relate generally to methods of enhancing cosmetic surfaces. More specifically a method for applying cold spray to form at least a portion of a joint is disclosed.

BACKGROUND

Friction stir welding ("FSW") is a solid state joining process that is currently being used in various industries where cosmetic appeal provides a significant market advantage. The microstructure of a FSW process area is divided into distinct zones. Each zone is substantially different from the other zones and from the base metal. When an anodizing operation is applied to an FSW processed area, the reflectivity is unique in each zone of the friction stir processed area and the base metal. Unfortunately, these differences in reflectivity significantly reduce the cosmetic appeal of the part.

SUMMARY

This paper describes various embodiments that relate to cosmetically masking a friction stir welded region of a friction stir welded part or joining parts using cold spray to improve a cosmetic appearance of the joint.

In one embodiment, a method for providing an appearance of continuity between a bulk material and a friction stir welded area of a workpiece formed of a first type metal is described. The method may include forming a layer of first type metal over the friction stir welded area of the workpiece by applying several particles over the friction stir welded area of the workpiece. At least some of the several particles are formed of the first type metal. The method may also include subsequent to the forming of the layer, operating on the layer in a manner that provides the appearance of continuity.

In another embodiment, a method for enhancing an appearance of a joint between a first and second metallic substrate is described. The method may include using a friction stir welding process to from the joint of a first type metal between the first and second metallic substrates. The method may further include applying a plurality of particles at a first end of the first metallic substrate and a second end of the second metallic substrate using cold spray operation. The first and second metallic substrates are formed substantially from the first type metal. The method may further include, subsequent to the forming of the joint, applying a finishing operation by anodizing the joint in a manner that provides an appearance of continuity between the first and second metallic substrates.

In another embodiment, a method using a plurality of particles to form a joint to combine a first substrate with a second substrate is described. The method may include engaging a first portion of the first substrate with a first portion of the second substrate at interface region, the interface region having an outer peripheral portion. The method may also include spraying a plurality of particles over the outer peripheral portion of the interface region, the plurality of particles formed from a material such that the plurality of particles deform upon impact proximate to the outer peripheral portion of the interface region.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The described embodiments may be better understood by reference to the following description and the accompanying drawings. Additionally, advantages of the described embodiments may be better understood by reference to the following description and accompanying drawings in which.

DETAILED DESCRIPTION

Figure 1:
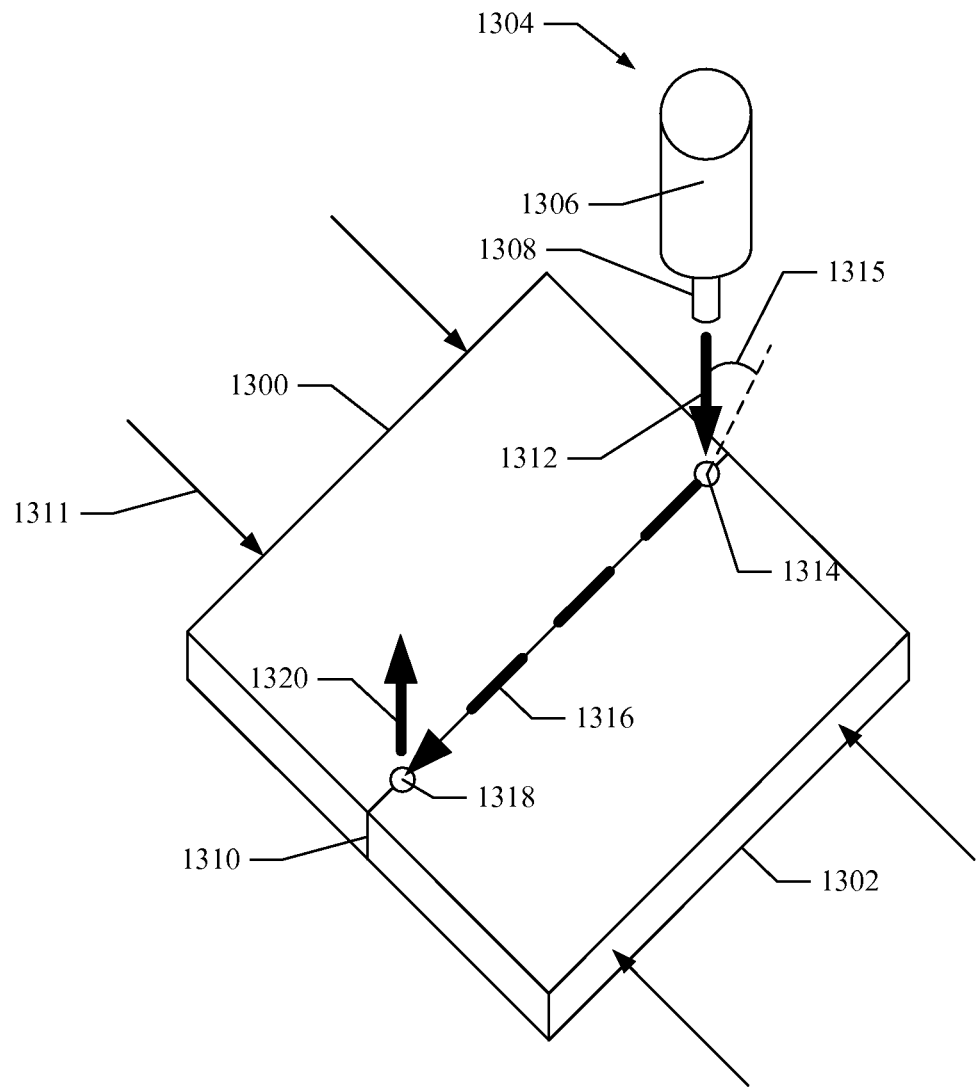
FIG. 1 illustrates a perspective view of an embodiment of a friction stir welding operation.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Friction stir welding ("FSW") is a low-heat method for joining two parts which may present certain advantages over traditional forms of welding. For example, traditional forms of welding generate high heat which may lead to warping or deforming a part or workpiece. Accordingly, traditional forms of welding are not suited for certain materials. Also, traditional welding may also create stresses the joint as a result of the heat which may eventually lead to failure of the weld. However, because FSW generates relatively less heat on the workpiece, FSW may be used to weld together workpieces that otherwise could not joined by traditional welding. Stresses may also build at the joint as a result of the heat that may eventually lead to failure of the weld.

Additionally, FSW may be advantageous in that it may not require use of flux or gases which could introduce contaminants into the weld. Introduction of contaminants into the weld may affect subsequent operations performed on the parts. For example, it may be more difficult to anodize the parts when contaminants have been introduced into the weld.

FSW is a solid state joining process that may be used in applications where the original metal characteristics must remain unchanged. The phrase "solid state joining process" as used in this detailed description and in the claims refers to a welding process such that a workpiece does not undergo a phase change. For example, a workpiece made of a material in a solid form does not melt (to a liquid) during an FSW operation. FSW functions by mechanically intermixing the two pieces of metal at the place of the joint, transforming them into a softened state that allows the metal to be fused using mechanical pressure. This process is primarily used on aluminum, although other materials may be welded, and is most often used on large pieces which cannot be easily heat treated post weld to recover temper characteristics.

The following disclosure relates to enhancing the appearance, or cosmetic appeal, of a structure after the structure undergoes a FSW process. FSW may be used to bond two substrates, and will be discussed in further detail below. Although the bond strength of FSW is sufficient for several applications, the surface area near the bonded region may become discolored. Further, FSW may alter some of the properties of the two substrates such that the reflectivity of the structure near the bonded regions differs from that of the reflectivity of the structure further away from the bonded region. This leads to a cosmetic issue, namely a structure with inconsistent coloration and/or reflectivity.

One solution to this issue solid state deposition ("SSD") over a top surface of the structure, include the visible bonded region. A SSD layer offers a method of enhancing the appearance of the surface of the structure by, for example, masking differences in coloration resulting from the FSW process. Further, SSD may include particles having similar properties to that of the structure. For example, SSD forms a layer that closely matches the top surface, giving an appearance of continuity with respect to color and/or reflectivity. Also, SSD offers a relatively simple and time-saving solution. Rather than perform an operation within the FSW area of the joined workpiece, SSD offers a topical solution. Embodiments of SSD will be discussed in further detail below.

These and other embodiments are discussed below with reference to FIGS. 1-16. However, those skilled in the art will readily appreciate that the detailed description given herein with respect to these figures is for explanatory purposes only and should not be construed as limiting.

FIG. 1 schematically illustrates an example embodiment of the friction stir welding process. As illustrated, a first part 1300 can be joined to a second part 1302 via friction stir welding using a tool 1304 configured to rotate. Tool 1304 includes shoe 1306 and a pin 1308 extending from shoe 1306 in a direction toward first part 1300 and second part 1302. In order to weld first part 1300 and the second part 1302 together along a joint 1310, a compressive force, indicated by the arrows 1311, may be applied which clamps first part 1300 and second part 1302 together along the joint 1310. A clamping mechanism (not shown) may be used to provide compressive force. First part 1300 and second part 1302 may be positioned and clamped such that they are substantially aligned in a coplanar configuration as illustrated, although various other embodiments of joints may be employed.

Tool 1304 may initially be inserted into the joint 1310 by directing the tool downward along a path 1312 at a starting point 1314. In some embodiments, tool is substantially perpendicular to first part 1300 and second part 1302. In the embodiment shown in FIG. 1, tool 1304 is tilted by an angle

1315. Tool 1304 may then traverse along a path 1316 between first part 1300 and second part 1302. The pin 1308 may be slightly shorter than the weld depth required, with shoe 1306 sliding atop a portion of first part 1300 and second part 1302.

Tool 1304 when rotated generates heat via frictional heat is generated between the tool 1304 and the workpieces (i.e., first part 1300 and second part 1302). This heat, along with that generated by the mechanical mixing process and the adiabatic heat within the material of the workpieces, cause the stirred materials of the workpieces to soften without melting, thereby creating the weld. As the pin 1308 is moved forward along the path 1316, the plasticized material moves to the rear (or the "wake" of pin 1308) where clamping force assists in a forged consolidation of the weld. This process of the tool 1304 traversing along path 1316 creates a solid state deformation involving dynamic recrystallization of the base material. After traversing the path 1316, the tool 1304 may be lifted from the material at an end point 1318 upward along a path 1320.

However, friction stir welding may present certain issues that may make friction stir welding undesirable in some circumstances. In this regard, certain defects may exist in the weld. For example, an open hole may exist at the start point 1314 and/or the end point 1318. Thus, friction stir welding may produce welds which are cosmetically unappealing at one or both of the ends thereof.

Figure 2:
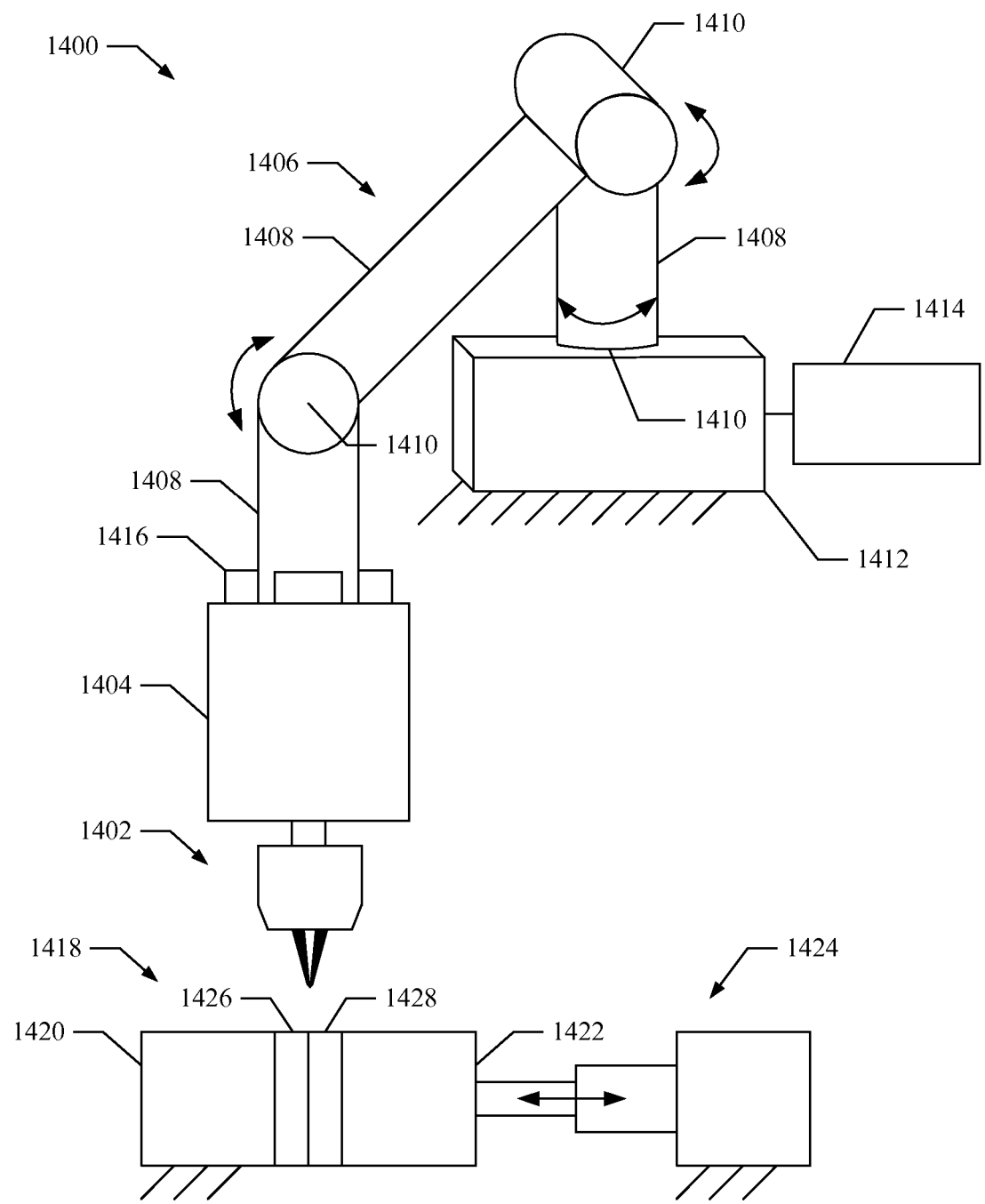
FIG. 2 illustrates a schematic view of a system for friction stir welding according to an example embodiment of the present disclosure.

Accordingly, embodiments of the disclosure are configured to improve the quality of welds produced by friction stir welding, for example by improving the appearance the welds. In this regard, FIG. 2 illustrates a FSW system 1400 according to an embodiment of the present disclosure. The friction stir welding system 1400 may include a tool 1402, which may be rotated by a motor 1404. The position of the motor 1404 and the tool 1402 may be controlled by a robotic assembly 1406. The robotic assembly 1406 may include one or more arms 1408, one or more joints 1410, and a base 1412. Arms 1408 may be rotated about the joints 1410 to position the tool 1402 at an appropriate position to perform a FSW operation. However, various other embodiments of robotic assemblies (e.g., gantry systems) may be employed to control the position of the tool 1402. FSW system 1400 may further comprise a controller 1414. The controller 1414 may be configured to control the robotic assembly 1406, the motor 1404, and/or other portions of the FSW system 1400.

In some embodiments, the friction stir welding system 1400 may further comprise one or more load cells 1416. The load cells 1416 may be configured to detect load applied to the friction stir welding system 1400. For example, during operation of the friction stir welding system 1400, the tool 1402 may tend to veer, or become misaligned, from a joint between first part 1426 and second part 1428 as a result of torque applied to the tool 1402. However, load cells 1416, which may be equally distributed around the motor 1404 and/or one of the arms 1408, may relay to controller 1414 so that controller 1414 may instruct the robotic assembly 1406 to compensate such that tool 1402 realigns over the joint. This allows a weld to be form closely follow the joint.

As illustrated in FIG. 2, in some embodiments the FSW system 1400 may further comprise a fixture 1418. In some embodiments the fixture 1418 may comprise a first fixture portion 1420 and a second fixture portion 1422. Further, an actuator 1424 (e.g., a hydraulic or pneumatic piston and cylinder) may be configured to compress the first fixture portion 1420 relative to the second fixture portion 1422. Accordingly, the fixture 1418 may compress a first part 1426 against a second part 1428 such that the tool 1402 may weld the first part and the second part together.

Figure 3:
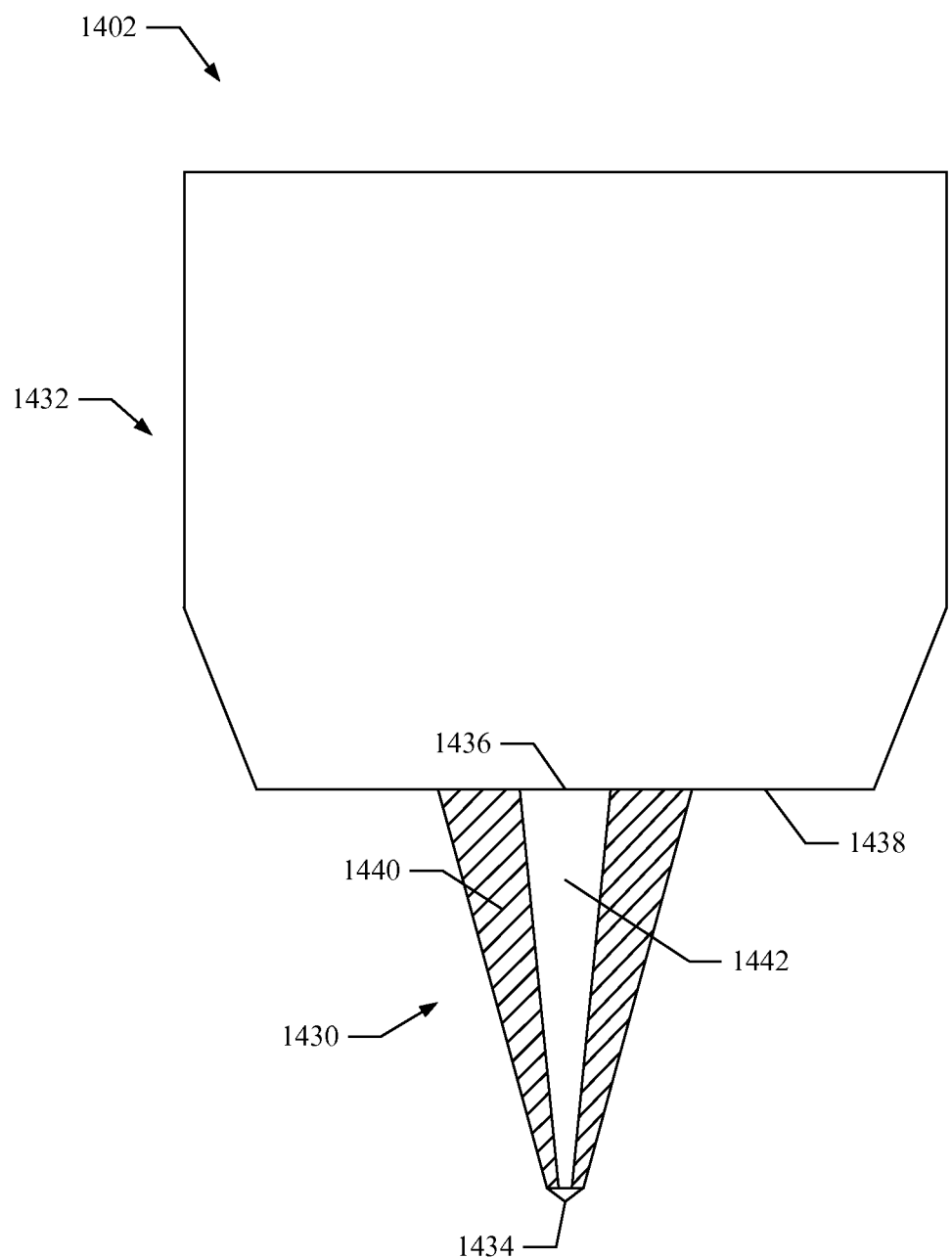
FIG. 3 illustrates a side view of a tool configured for friction stir welding according to an example embodiment of the present disclosure.

FIG. 3 illustrates an enlarged side view of the tool 1402 configured for friction stir welding. As illustrated, the tool 1402 may include a pin 1430 and a shoe 1432. In some embodiments, pin 1430 is generally cylindrical. In the embodiment shown in FIG. 3, pin 1430 is conical. Pin 230 may extend between a first end 1434 and a second end 1436. Pin 1430 may be truncated at the first end 1434 such that the pin 1430 does not extend to a point at the first end 1434. In one embodiment, first end 1434 may have a diameter approximately in the range of 0.5 mm to 3 mm, and second end 1436 may have a diameter approximately in the range of 5 mm to 9 mm. The shoe 1432 may define a shoulder 1438 proximate the second end 1436 of the pin 1430. Shoulder 1438 is generally planar and configured to slide atop the surface of the joint 1410 (shown in FIG. 2).

Figure 4:
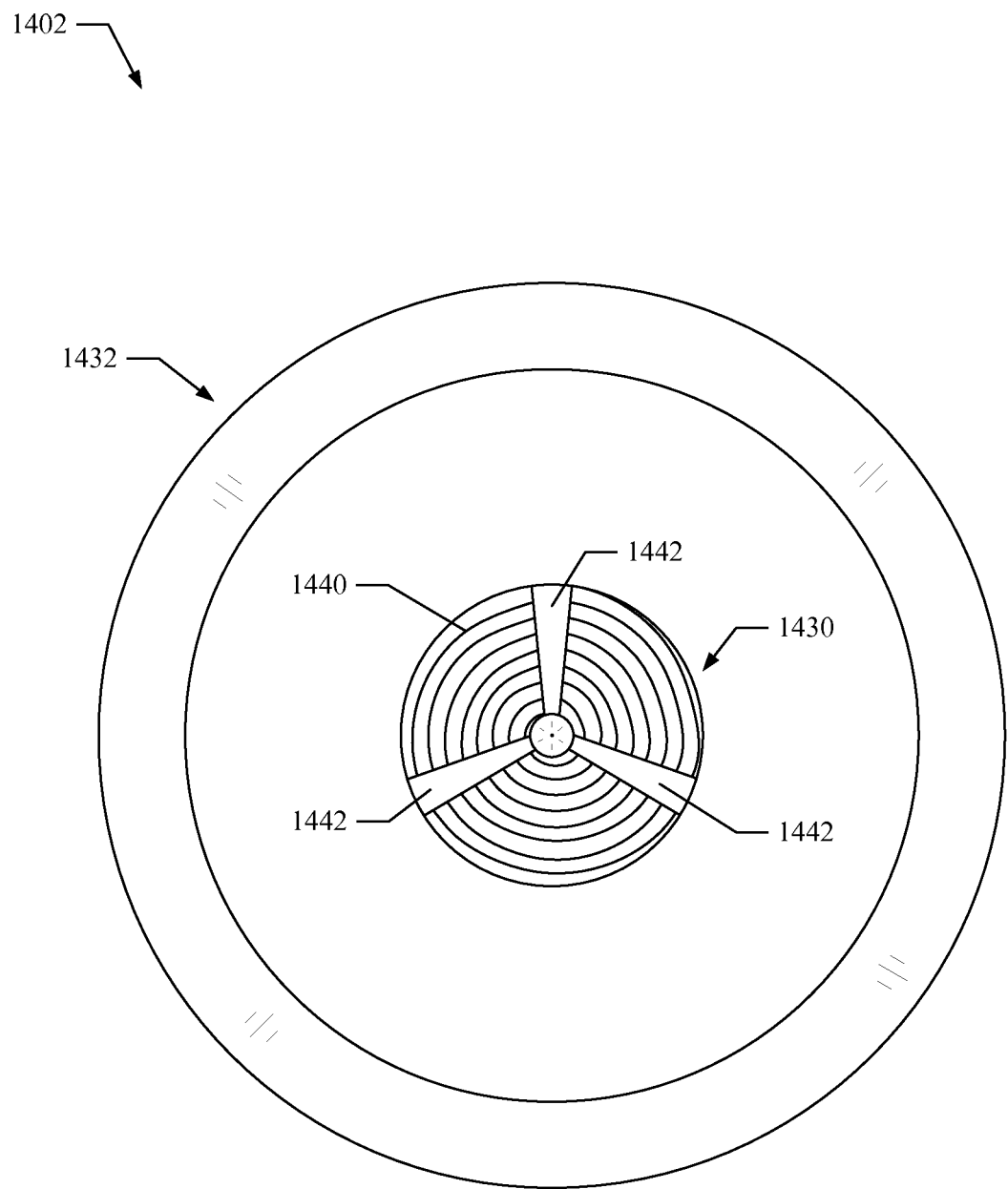
FIG. 4 illustrates a bottom view of the tool shown in FIG. 3.

In order to generate additional friction, tool 1402 may have additional structure. FIG. 4 shows a bottom view of tool 1402 shown in FIG. 3. Pin 1430 include an outer surface having a threaded portion 1440 and a flat portion 1442. This is further illustrated FIG. 4 shows a bottom view tool 1402 shown in FIG. 3. In some embodiments, pin 1430 includes two or less flat portions 1442. In other embodiments, pin 1430 includes four or more flat portion 1442. In the embodiments shown in FIG. 4, pin 1430 includes three flat sections 1442, which may be equally spaced around the circumference of the threaded portion 1440.

As pin 1430 rotates, the materials of the two workpieces being welded may intermix. In particular, the conical shape pin 1430, threaded portion 1440, and the flat portion 1442 may function to draw the materials up against shoulder 1438 of shoe 1432 and then back down in the opposite direction while intermixing the plasticized materials. This may provide for improved intermixing between the materials.

Figure 5A:
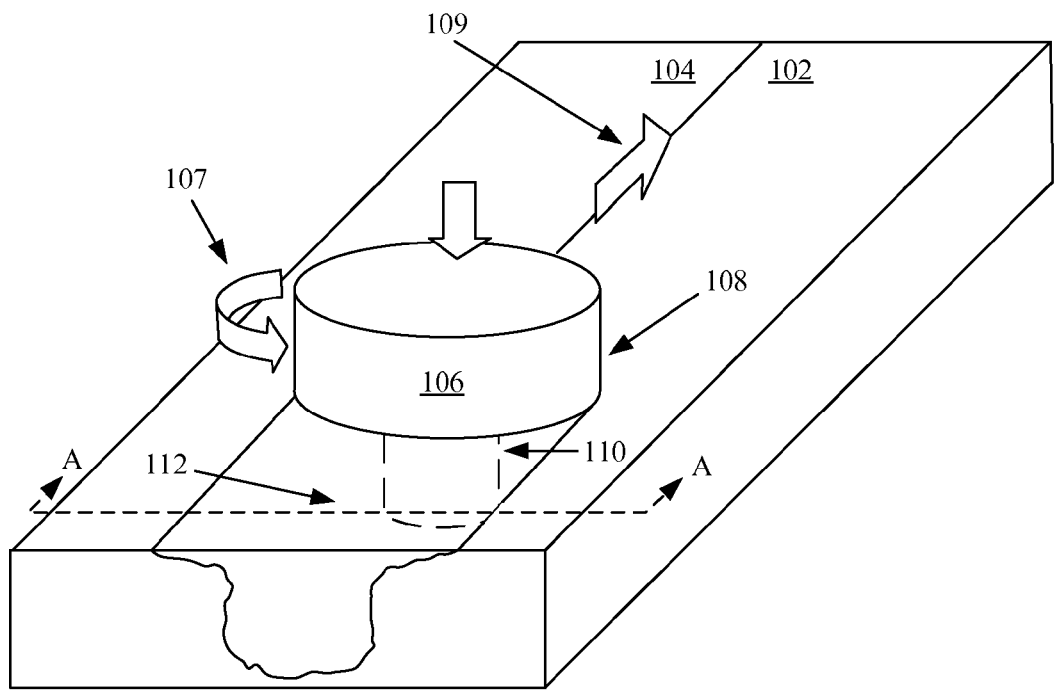
FIGS. 5A-5B show an embodiment of a friction stir welding process.

FIG. 5A shows a perspective view of an exemplary FSW operation. FSW is used to join two substrates 102 and 104 together. In some embodiments, substrates 102 and 104 are made of a metallic material. In the embodiment shown in FIG. 5A, substrates 102 and 104 are aluminum. The composition of substrates 102 and 104 can be referred to as bulk material. Prior to an FSW operation the surfaces of the substrates 102 and 104 to be joined are clamped together (not shown). The clamping process keeps substrates 102 and 104 generally engaged throughout the FSW process. A FSW operation involves a FSW tool 106. FSW tool 106 is a rotational tool that typically includes at least shoulder 108 and pin 110. By rotating FSW tool 106 rapidly, in the direction indicated by the tool rotation arrow 107 along a welding direction 109, pin 110 can create friction which imparts heat to the weld region sufficient to stir up the metal on both sides of the interface between substrates 102 and 104. In this way, a friction stir welded region 112 is formed that joins substrates 102 and 104 together.

FSW causes changes in the microstructure of the base material. Extreme plastic deformation and significant heat generation in the friction stir process zone result in recrystallization and development of texture within the friction stir process zone. Precipitate dissolution and coarsening in and around the process zone also occur. In research literature, the microstructural characterization of grains and precipitates generated by FSW are broken down into three distinct zones: stirred zone (nugget), thermo-mechanically affected zone (TMAZ), and heat-affected zone (HAZ) as shown in FIG. 5B.

Figure 5B:
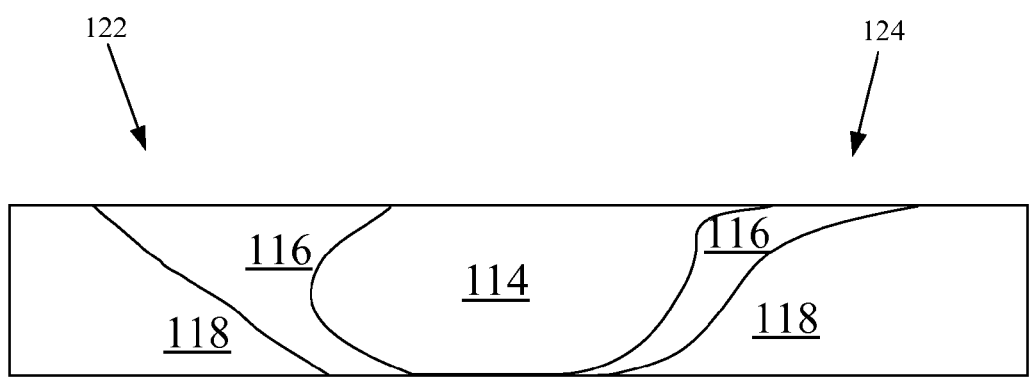

FIG. 5B is a cross-section of taken along line A-A in FIG. 5A, showing a representation of a macrograph with the microstructural zones of FSW. It should be noted that microstructure within each zone can also be highly variable. A recrystallized fine-grained microstructure is formed by the intense frictional heating and plastic deformation that occurs during FSW. This fine-grained recrystallized region is known as the nugget zone or the dynamically recrystallized zone (DXZ), and is depicted in FIG. 1B as nugget zone 114. There is usually low dislocation density in the interior of the recrystallized grains. The interface between nugget zone 114 and the parent metal is relatively defuse on the retreating side 122 and sharp on the advancing side 124.

Thermo-mechanically affected zone (TMAZ) 116 is a transition zone between the parent material and nugget zone that is unique to FSW. Both temperature and plastic deformation are experienced by TMAZ 116 during FSW resulting in a highly deformed structure. The elongated grains of the parent metal are deformed in a flowing pattern around the nugget. Dissolution of some precipitates is typically observed in TMAZ 116.

Heat affected zone (HAZ) 118 experiences a thermal cycle during FSW but does not experience plastic deformation. Although HAZ 118 retains the same grain structure as the parent material, thermal exposure can have a significant effect on the precipitate structure. Coarsening of the strengthening precipitates and widening of the precipitate-free zone (PFZ) is a common concern in FSW of precipitate strengthened alloys.

Etching is a process where a chemical or electrochemical attack is used to remove material from unprotected metal. In metallography it is a common practice to use chemical etchants to reveal the microstructure of metallurgical samples. The electrochemical potential of the metal is a function of microstructure. Therefore the metal will corrode at rates that vary with microstructure. Varying corrosion rates lead to variations in topology and/or reflectivity.

Anodizing is an electrolytic passivation process that increases the natural oxide layer on the surface of the metal part. Etching is often a part of the anodizing process. Variation in the initial microstructure, especially precipitate distribution, of a part has a strong effect on the final surface appearance of an anodized part.

Solid state deposition processes function by propelling particles at high velocity to impact a substrate. When the particles impact the substrate, the particles undergo plastic deformation, forming a metallurgical bond to the surface. The most common method of solid state deposition is known as "cold spray." Cold spray, or supersonic cold spray, emits particles at speeds greater than 1,000 meters per second.

Figure 6:
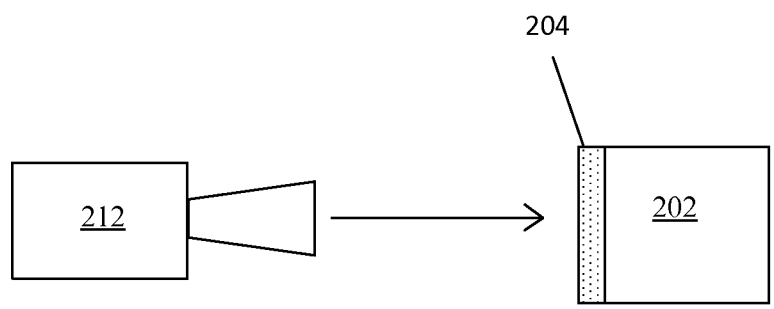
FIG. 6 shows an embodiment of a simplified representation of a cold spray process.

A simplified diagram of the cold spray process is shown in FIG. 6. Chamber 212 includes powder particles (not shown) and pressurized gas (not shown). The pressurized heated gas causes the powder particles to exit chamber 212 at as high velocity particle-gas mixture in a direction toward substrate 202. The powder particles are shown as material 204 deposited on substrate 202. Because solid state deposition is a solid state process, it shares many of the same advantages as friction stir processing such as reduced heat input, oxidation, and grain growth. Another additional advantage of cold spray is a consistent microstructure across the surface of the part when appropriate parameters are used. Cold spray may also be used to repair, for example, worn turbines or cracks in military equipment.

Cold spray has several additional advantages. For example, cold spray may be used as a low-heat strength treatment process. This process may provide similar mechanical properties (e.g., strength or bonding) as other high-heat strength treatment applications. However, unlike high-heat application, cold spray offers less undesirable thermal effects such deforming the emitted powder particles during cold spray and/or deforming the workpiece due to high heat of the powder particles. The workpiece may include an enclosure of an electronic device.

Solid state deposition or cold spray can be used to enhance cosmetic appeal of a friction stir processed part. Cosmetic appeal generally include achieved a desired visual effect. For example, cosmetic appeal may include a particular color(s) or reflectivity (gloss) of a structure. Friction stir processing can refer broadly to any of the following: friction stir welding, friction stir mixing, friction surfacing, friction hydro pillar processing, friction stir forming, friction extrusion, and friction stir spot welding. Solid state deposition can be used to apply a consistent microstructure to the surface of a friction stir welded part, thereby eliminating cosmetic defects that typically occur when anodizing friction stir processed parts. Also, solid state deposition can deposit a layer of material to the surface of the friction stir processed area that will alter the reflectivity of the surface friction stir processed area to enhance post anodized cosmetic appeal. Also, solid state deposition across the friction processed area can eliminate the visibility of the weld joint line.

Figure 7A:
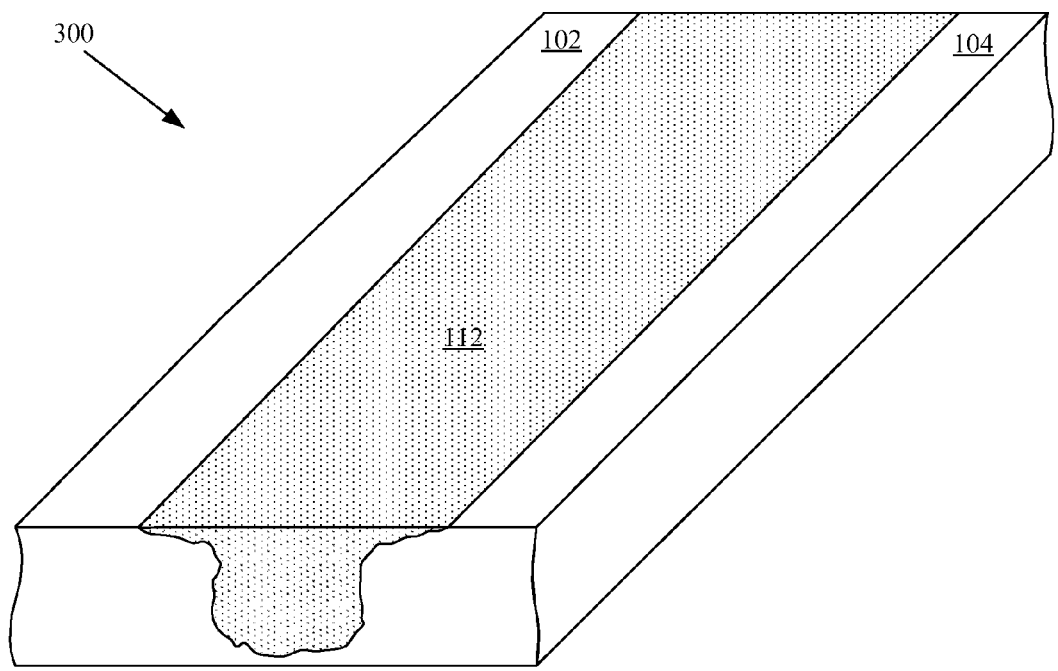
FIG. 7A-7D illustrates a series of steps for applying solid state deposition to a friction stir processed part, in accordance with the described embodiments.

FIG. 7A shows a representation of friction stir processed part 300, or simply part 300. Friction stir welded portion 112 is disposed between joined substrates 102 and 104. Because of the varied properties of material within friction stir welded portion 112, without further processing a stark difference is evident between friction stir welded portion 112 and adjacent portions of joined substrates 102 and 104. Also, in some embodiments (not shown), friction stir welding portion 112 includes portions having an elevation higher than that of substrates 102 and 104. For example, there may be bumps or burrs from the resultant FSW process previously described. This may be undesirable for structures forming part of, for example, an electronic device. In some embodiments, a removal process is performed subsequent to the FSW process. The removal process may include a machining process including grinding off the bumps or burrs in order to achieve a desired surface, such as the continuous substrate-FSW portion surface shown in FIG. 7A. In other embodiments, a sanding process removes the bumps or burrs. Still, in other embodiments, a sandblasting step removes the bumps or burrs. Also, in some embodiments, a polishing process may be performed subsequent to the removal process. The polishing process may provide a uniform surface texture across substrates 102 and 104, and may further form a consistent coloration and/or reflectivity.

Figure 7B:
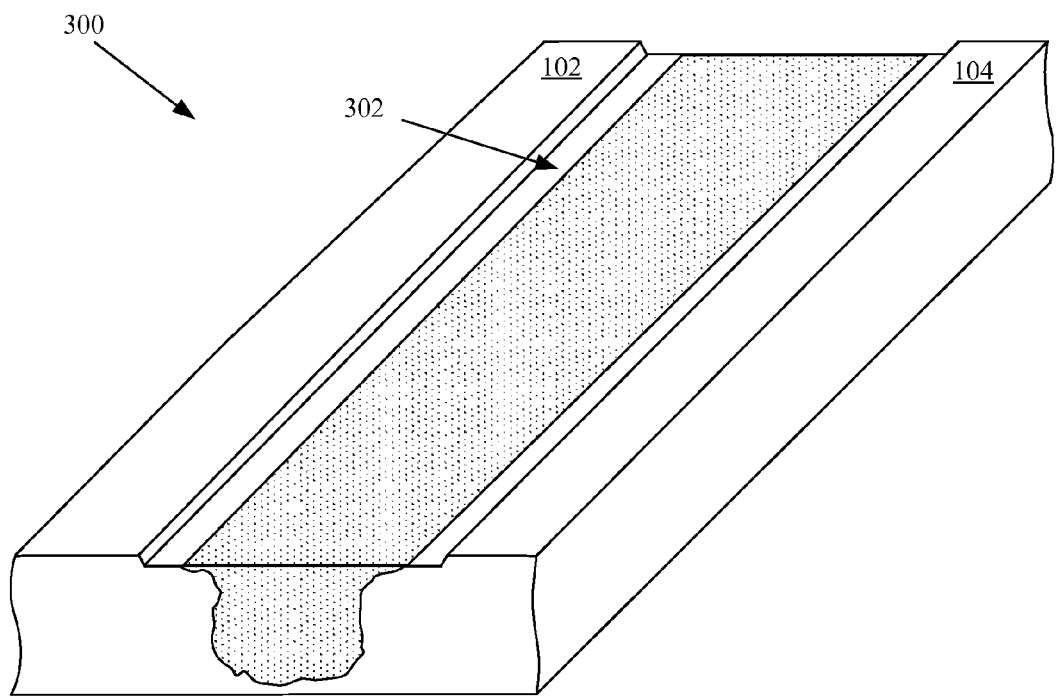

In addition to removing bumps or burrs, additional machining may be further desired. For example, FIG. 7B illustrates a trough or channel 302 machined along a top portion of friction stir welded portion 112. In this way, material affected by the friction stir welding operation can be machined away from a cosmetic top surface of part 300. While channel 302 is depicted as being substantially flat, channel 302 can have several geometries conducive for use with the disclosed embodiments. Also, in some embodiments, a coating may be applied to channel 302 which may service several purposes. For example, the coating may mask the appearance of a joint formed by the friction stir weld process. Also, the coating may include a material, or materials, similar to substrates 102 and 104 such that the color and/or reflectivity of the coating match substrates 102 and 104. Also, the coating may fill channel 302 such that the coating is co-planar with substrates 102 and 104.

Figure 7C:
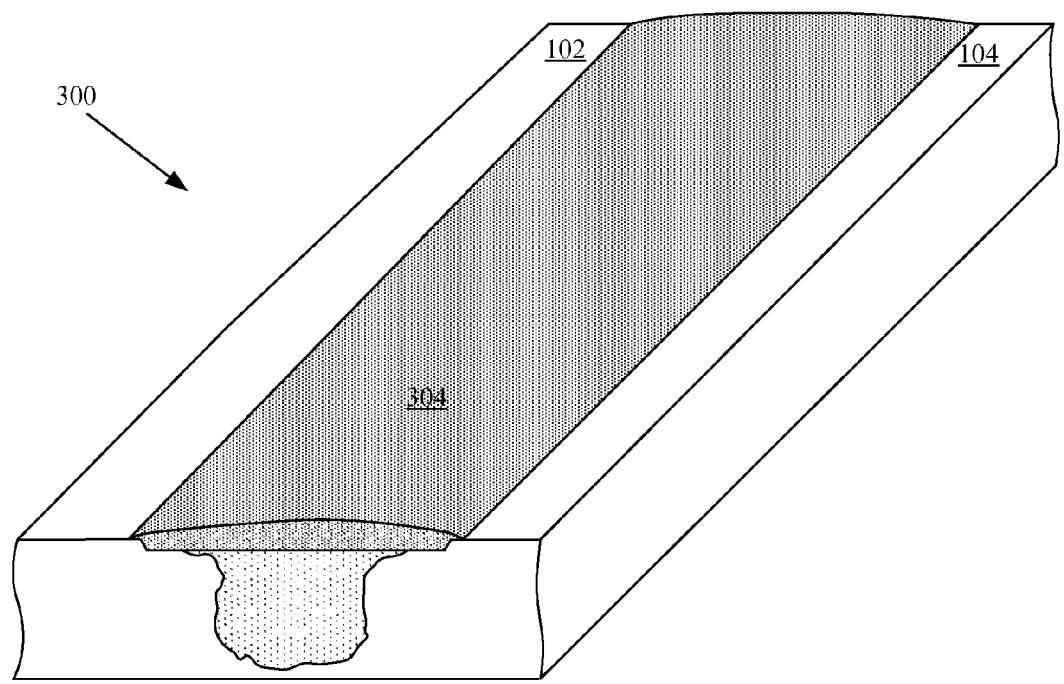

Other methods of filling channel 302 may be used to achieve a certain visual effect. For example, FIG. 7C shows a solid state deposition 304 filling channel 302. In some embodiments, solid state deposition includes a cold spray process previously described. Solid state deposition 304 may include several particles having a size or diameter approximately in the range of 1 to 40 microns. As depicted, solid state deposition 304 is disposed slightly above a surface of part 300. In some embodiments, solid state deposition 304 can be shaped such that solid state deposition 304 tapers down to join cosmetic surfaces of joined substrates 102 and 104. In other embodiments, excess solid state deposition 304 is removed by removal means previously described such that solid state deposition 304 blends in with the rest of part 300.

Figure 7D:
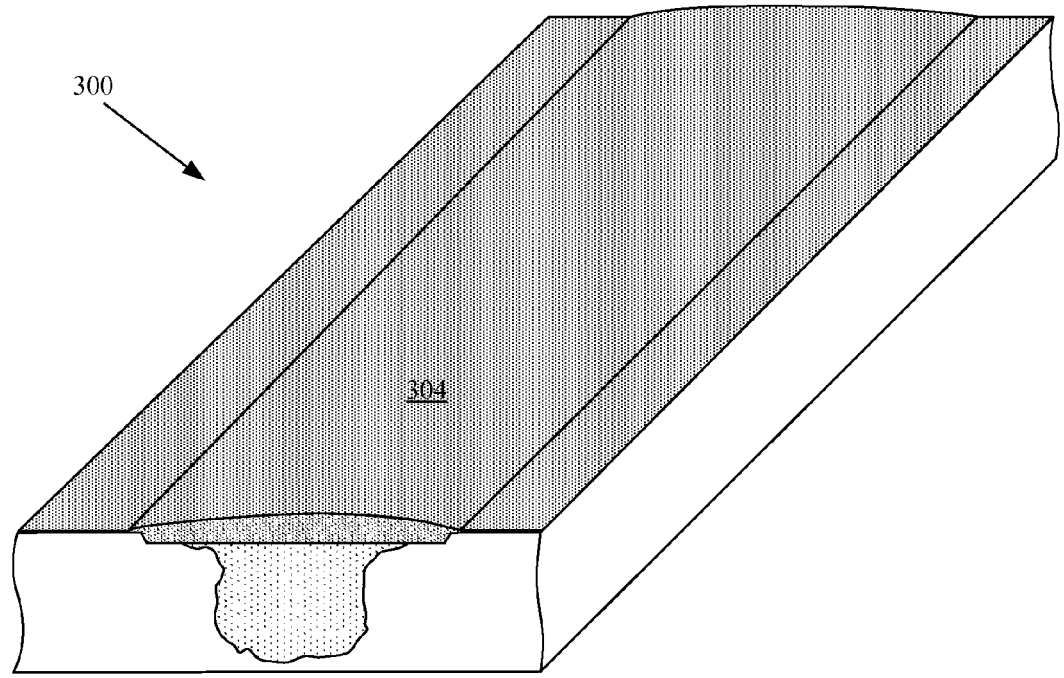

In addition to covering the friction stir welding portion (i.e., the joint), the entire top surface of the joined substrates may receive solid state deposition 304. In this manner, the top surface includes a consistent color and reflectivity with minimal processes performed on the top surfaces. FIG. 7D shows an embodiment in which solid state deposition 304 is disposed in not only channel 302 but also across the top surface of part 300. In this way, any difference in coloration and/or reflectivity between part 300 and the friction stir welded portion is no longer visible, and an appearance of continuity is formed. In some embodiments, the thin layer of solid state deposition 304 covers only a portion of part 300. In one embodiment the thin layer of solid state deposition 304 extends only to a proximate geometric feature such as an edge feature characterized by a substantial curve or corner feature. It should be noted that curves associated with edge features tend to mask any slight differences that can be present between solid state deposition 304 and joined substrates 102 and 104. It should also be noted that in some embodiments grain size of deposited particles can be varied to match a cosmetic surface of part 300.

Figure 8:
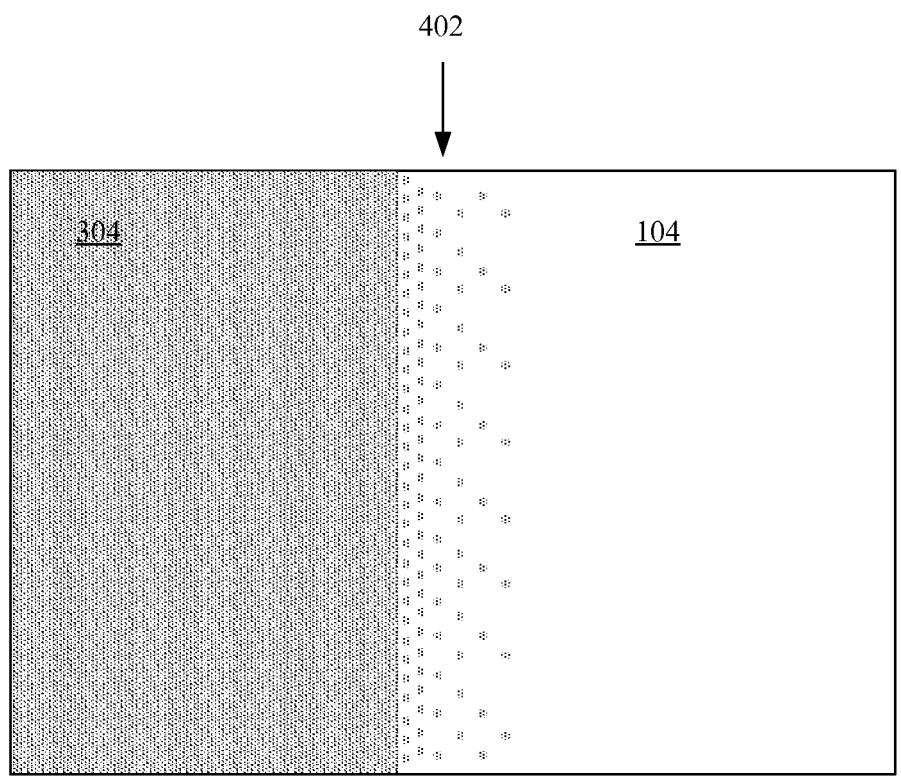
FIG. 8 illustrates a feathering, or blending, process configured to mask differences in color or reflectivity of the solid state deposition and the underlying substrate.

In some embodiments, it may be unnecessary to apply solid state deposition 304 across the entire top surface while still achieving desired cosmetic effects (e.g., matching color across the top surface). FIG. 8 illustrates an embodiment of a feathering process used to blend solid state deposition 304 with substrate 104. In some embodiments, blending includes a gradually fading of solid state deposition 304 on substrate 104. In this manner, any differences in color or reflectivity of the two materials together are difficult to visually detect. Because solid state deposition 304 is generally deposited in a spray pattern, the blending process is natural alternative to coating the entire surface. Boundary 402 represent a portion of gradually decreasing density (or thickness) of solid state deposition 304 to form solid state deposition 304 that is tapered. For example, the thickness of solid state deposition 304 near a central portion of the structure may be greater than that of an area toward an outer portion the structure. This may be achieved by reducing the amount of solid state deposition 304 from the central portion to the outer portion. In some embodiments, a subsequent finishing operation can also be configured to reduce a thickness of solid state deposition 304 in the boundary region such that the feathering effect is further enhanced. Finishing operations may include anodizing solid state deposition 304 along with the structure. It should be understood that sufficient thickness of solid state deposition 304 is applied to the top surface of substrate 104 such that the anodizing process does not remove solid state deposition 304 to expose the underlying top surface. Also, it should be understood that a similar process could be performed on substrate 102 (not shown in FIG. 8).

In addition to the feathering process, there may methods used to cosmetically blend a solid state deposition with a part or substrate. For example, an etching step previously described may be used to dissolve precipitates in the solid state deposition exposed to the surface. This may result in a dimpled, or roughened, surface. Also, solid state deposition used in the described embodiment may undergo an atomization process. This process also dissolves precipitates resulting in a similar roughened surface. In either case, the roughened surface includes an associated reflectivity. In some embodiments, this roughened surface is similar to that of the substrates such that no additional machining steps are required. Also, in some embodiments, a sandblasting step may be used to form a gradually reduced solid state deposition.

Figure 9:
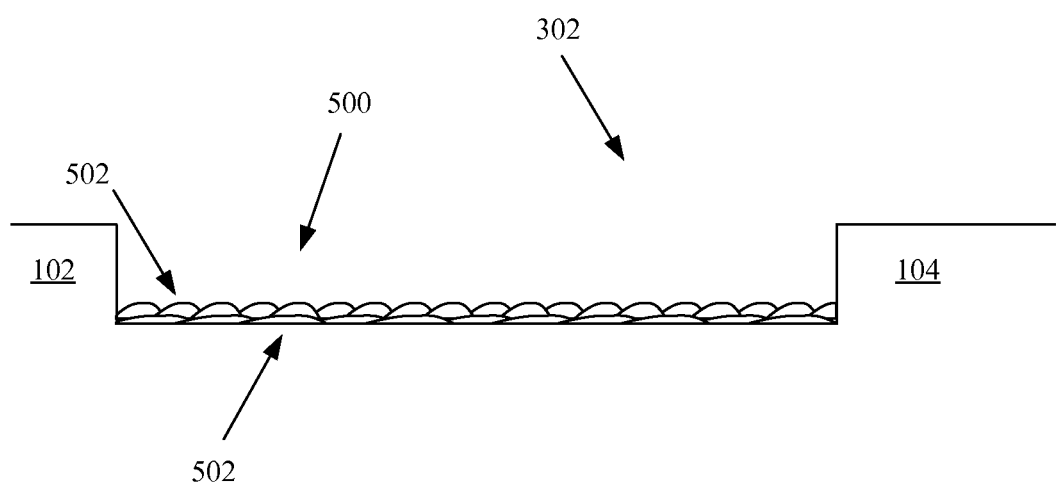
FIG. 9 shows a cross-sectional side view of solid state deposition deposited within a channel.

However, in other embodiments, additional steps may be required in order to form an appearance of continuity. FIG. 9 shows a cross-sectional side view of a cold spray deposited within channel 302 between previously described substrates 102 and 104. In some embodiments, solid state deposition includes nanoparticles 500. In some embodiments, nanoparticles include a metallic material or materials. In particular, nanoparticles 500 may include aluminum (e.g., AA 6063 aluminum alloy). This allows the texture of the solid state deposition to match the texture of substrates 102 and 104 to which solid state deposition is applied. During the solid state deposition into channel 302, an average kinetic energy ("KE") associated with metallic nanoparticles 500 of the solid state deposition can cause metallic particles to deform and adhere to a targeted substrate. As shown in FIG. 9, a sub-laying having high average KE nanoparticles 501 are squashed, or flattened, when colliding with channel 302 due to high speed collisions. Meanwhile, a sub-layer having low average KE nanoparticles 502 collide with channel 302 with a relatively lower speed than that of high KE energy nanoparticles 501. As a result, high average KE nanoparticles 501 are relatively deformed as compared to high average KE nanoparticles 501. Alternatively, low average KE nanoparticles 502 are relatively round as compared to high average KE nanoparticles 501. It should be understood that the same squashing effect could occur on portions of substrates 102 and 104.

In addition to geometry, there may be other differences between high KE energy nanoparticles 501 and low average KE nanoparticles 502. For example, high average KE nanoparticles 501 generally reflect more light than that of low average KE nanoparticles 502. This is due in part to the relative flatness of high average KE nanoparticles 501. Further, high average KE particles 501 include a lower angle of incidence than that of low average KE particles 502.

Also, because the solid state deposition is generally free of impurities, a resulting finished surface of the solid state deposition can be significantly smoother than that of substrates 102 and 104. Applying the solid state deposition at lower kinetic energy levels can create relatively rough surface. FIG. 9 shows a surface within channel 302 having a matte, or less reflective, surface. In some configurations, the matte surface produced by the low average KE nanoparticles 502 can produce a surface finish that more closely matches a remaining portion of substrates 102 and 104. In such a configuration, an etching step could may not be required because the color and/or reflectivity of low average KE nanoparticles 502 achieves the desired matching qualities.

In yet another embodiment, a powdered precipitate (e.g., magnesium silicide, iron) can be added to nanoparticles 500. The relatively impure powdered precipitate can reduce a resulting reflectivity of the surface and allow it to blend more evenly with joined substrates 102 and 104. A mixture ratio of powdered precipitate can be varied such that the resulting solid state deposition mix substantially matches the reflectively of a surrounding area of joined substrates 102 and 104. In any case, it should be noted that the deposited solid state deposition should have a depth such that the applied anodization layer does not remove the entire deposited cold spray layer. In some embodiments, the deposited solid state deposition layer is approximately 20 microns.

Figure 10:
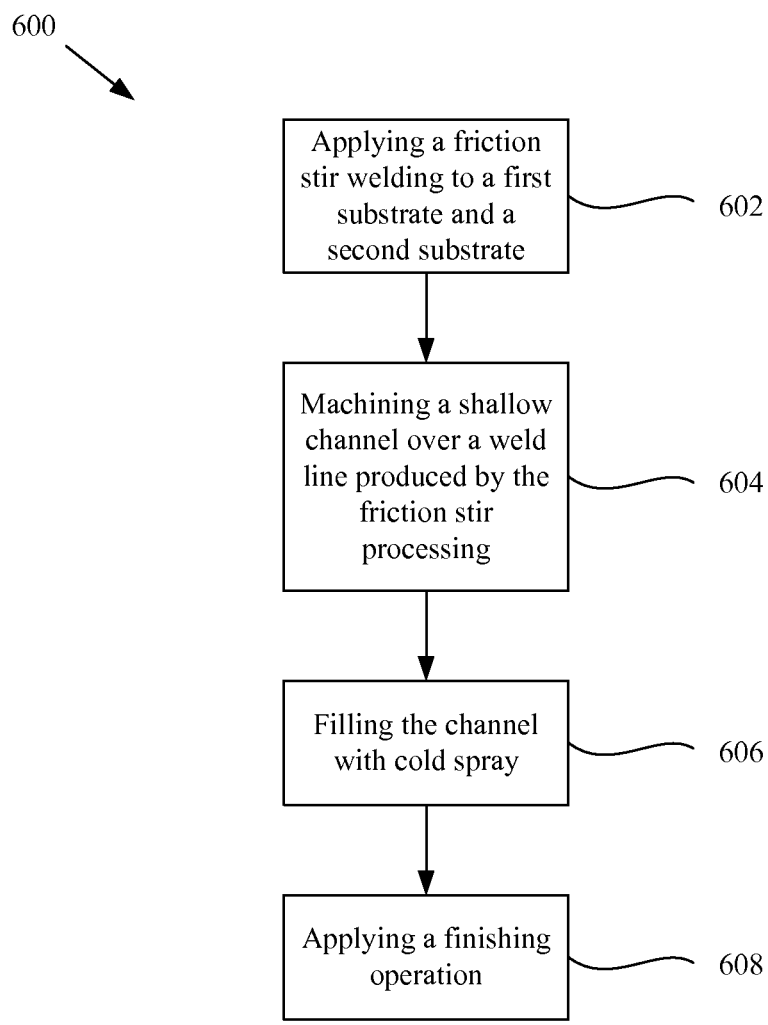
FIG. 10 shows a flowchart of a method for applying a solid state deposition to improve cosmetics of a friction stir welded part, in accordance with the described embodiments.

FIG. 10 shows a flowchart 600 of a method for applying solid state deposition to enhance cosmetics of a friction stir welded part. In step 602, a FSW is applied to bond a first substrate and a second substrate. The FSW may include a rotational tool used to create friction along a portion of the first substrate and the second substrate to be joined. In some embodiments, a machining step is used to remove bumps or burrs created form the FSW step. In other embodiments, a sandblasting step is used to remove the bumps or burrs. In step 604, a channel is machined over a stir friction zone produced by the FSW step. The stir friction zone is generally a portion of the first substrate and the second substrate altered by the FSW step. In some embodiments, the channel is filled with a coating. Also, in some embodiments, the channel removes bumps or burrs created during the FSW step. In step 606, a solid state deposition is applied to fill in the channel. In some embodiments, the solid state deposition fills the channel such that the solid state deposition portion creates a continuous, linear surface with the first substrate and the second substrate. In other embodiments, the solid state deposition covers the entire top portion of the first substrate and the second substrate thereby creating a surface with a consistent color and/or reflectivity. Still, in other embodiments, the solid state deposition is feathered, or blended, to create an appearance of a uniform color and/or reflectivity among the first substrate, the second substrate, and the solid state deposition. In step 608, a finishing operation is applied over the solid state deposition. In some embodiments, the finishing operation is an anodization step previously described. In other embodiments, an etching step previously described. Generally, the finishing operation is configured to create an enhanced appearance such that the visual effects of the FSW step are not visible.

Figure 11A:
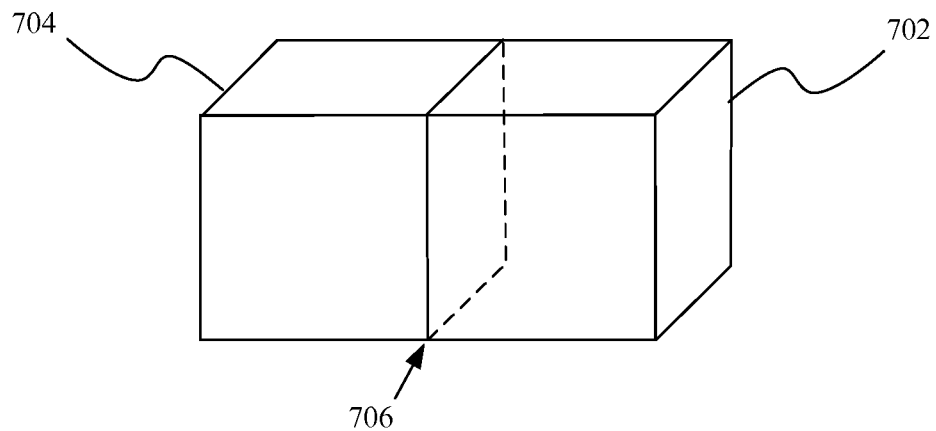
FIGS. 11A-11B illustrates an embodiment of a solid state deposition used as a cosmetic joint for a pair of substrates.
Figure 11B:
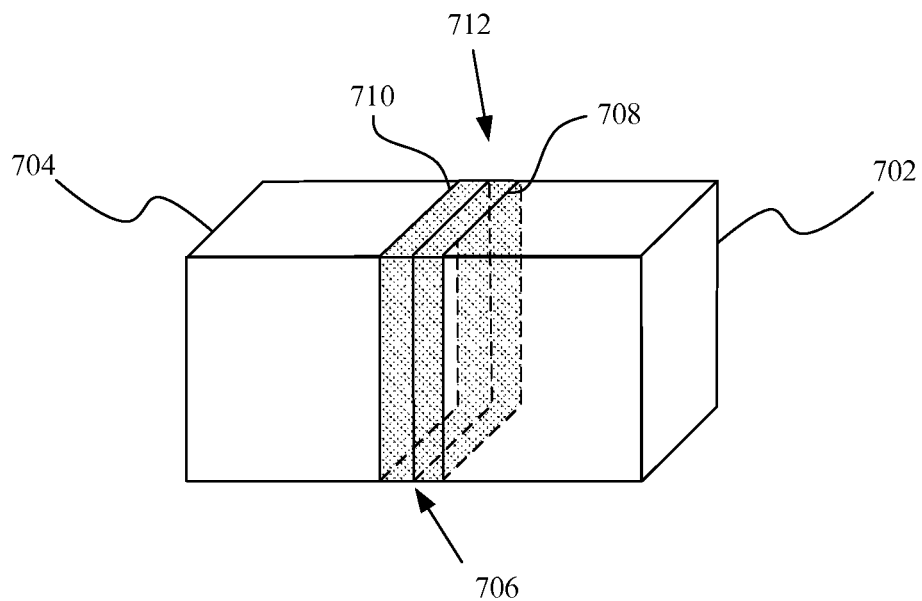

In addition to forming an enhanced appearance, solid state deposition may be used for additional processes. For example, FIGS. 11A-11B illustrate solid state deposition used to form a joint. The joint is configured to join first substrate 702 and second substrate 704. In FIG. 11A, first substrate 702 is engaged with second substrate. At this point, these substrates are otherwise separable. Instead of using the solid state deposition to cover a FSW portion, the solid state deposition is capable of joining first substrate 702 and second substrate 704. As shown in FIG. 11B, first substrate 702 and second substrate 704 are permanently joined at an interface region 706 after applying a solid state deposition 712 to an outer peripheral portion 708 of first substrate and an outer peripheral portion 710 of second substrate. In some embodiments, as shown in FIG. 11B, solid state deposition creates a joint having similar strengths and mechanical properties as those of heat treated processes (e.g., arc welding). However, issues associated with the heat treated process (e.g., deformation of first substrate 702 and/or second substrate 704) do not occur using a relatively cooler solid state deposition. It should be understood that the same machining and/or finishing techniques previously described may be employed in order for the solid state deposition to match first substrate 702 and/or second substrate 704 in terms of color and/or reflectivity, thereby enhancing the appearance of the structure.

Figure 12A:
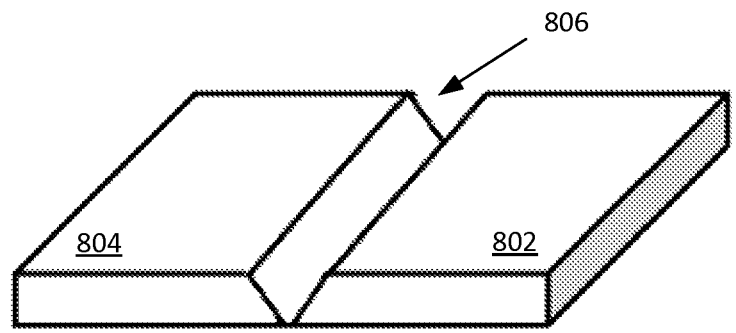
FIGS. 12A-12B illustrates another embodiment of a solid state deposition used as a cosmetic joint for a pair of substrates.
Figure 12B:
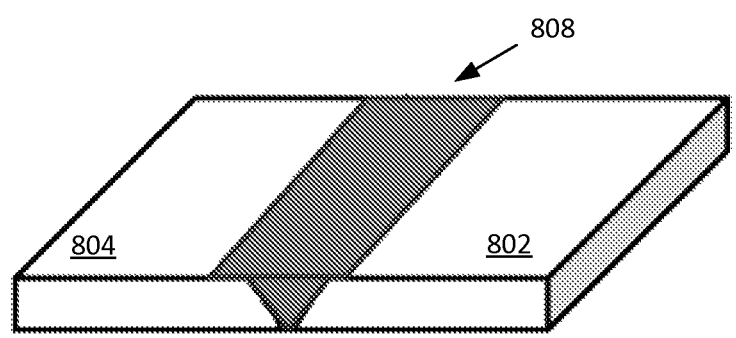

In other embodiments, a groove may be formed in order to receive additional solid state deposition. Additional solid state deposition may increase the bonding strength between two substrates. FIG. 12A shows interface groove 806 arranged between first substrate 802 and first substrate 804. Groove 806 is generally V-shaped. However, groove 806 may be another shaped configured to receive solid state deposition in order to achieve a desired bonding strength. FIG. 12B shows solid state deposition 808 applied within groove 806. Also, solid state deposition 808 is shown in an area extending away from interface groove 806 so that peripheral edges of solid state deposition 808 can be feathered in a manner previously described in order to form continuity among first substrate 802, second substrate 804, and solid state deposition 808. However, it should be understood that the same machining and/or finishing techniques previously described may be employed in order for the solid state deposition to match first substrate 802 and/or second substrate 804 in terms of color and/or reflectivity, thereby enhancing the appearance of the structure.

Figure 13A:
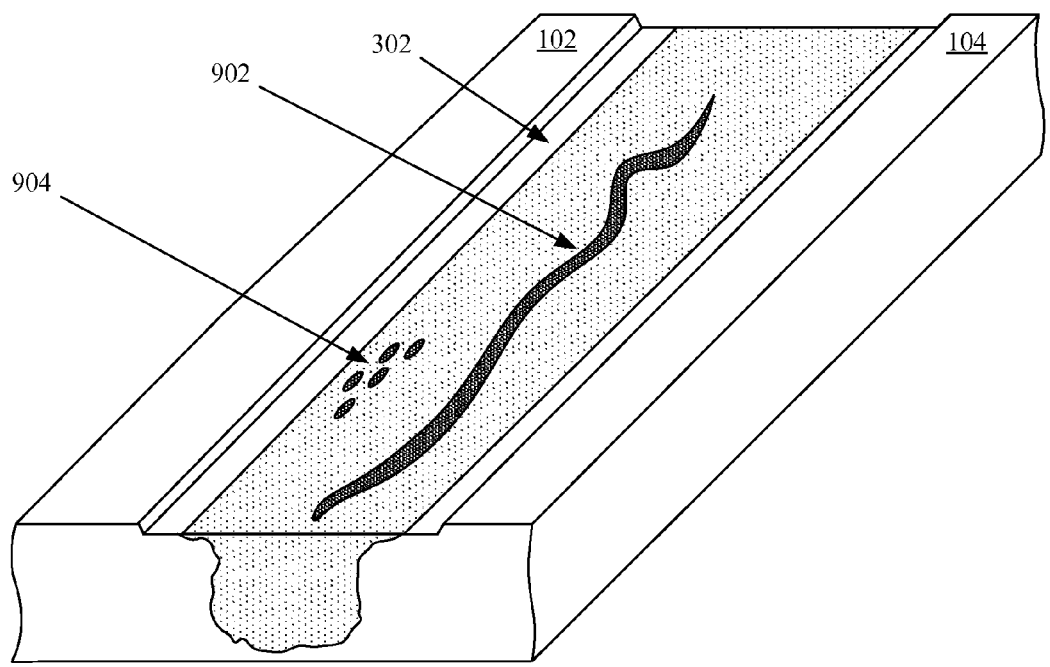
FIGS. 13A-13B illustrates an embodiment of solid state deposition used to repair cosmetic and structural defects.
Figure 13B:
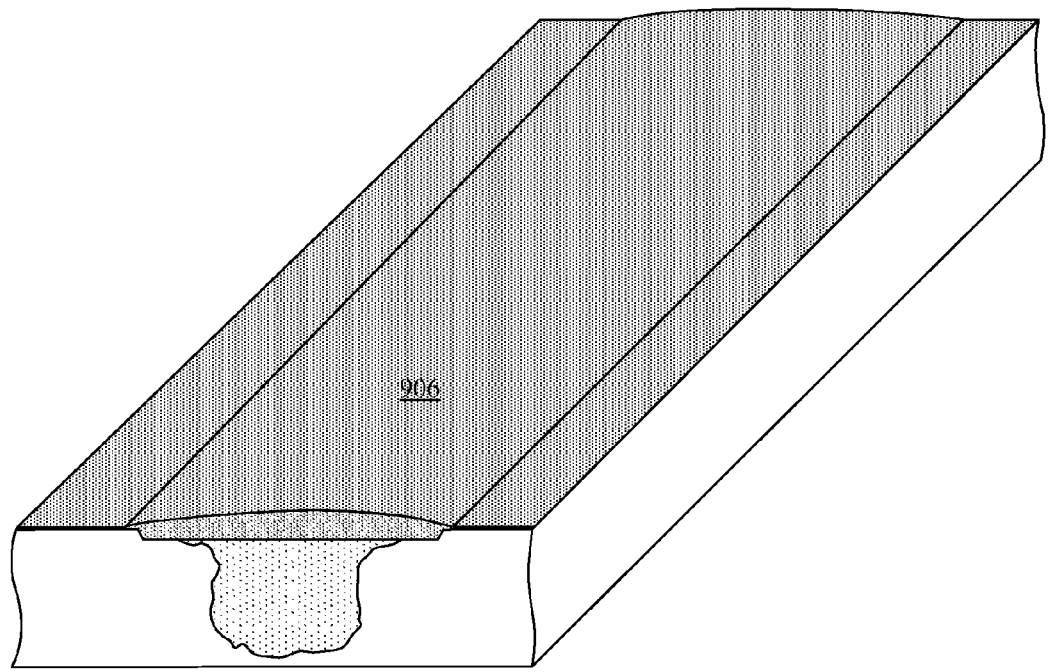

In addition to enhancing an appearance and forming a joint, solid state deposition may be used for additional purposes. For example, FIG. 13A shows how a solid state deposition used to repair a processed piece having a cracked region 902 and pitting 904. Because solid state deposition produces a sturdy and reliable substrate in addition to its cosmetic benefits, solid state deposition can be used to fix cosmetic and structural defects. As shown in FIG. 13A, cracked region 902 is filled as part of a solid state deposition designed to fill in channel 302. The solid state deposition process is performed subsequent to a FSW process joining substrates 102 and 104. Solid state deposition 906, as depicted in FIG. 13B, can also mask pitting 904. Furthermore, in cases where a FSW seam between the FSW region and the joined substrates 102 and 104 are not fully engaged, solid state deposition 906 can fill in and solidify the portion that is not fully engaged (similar to FIGS. 11A-12D). It should be noted while a few limited examples have been used to describe materials commonly found in cold spray nanoparticles, solid state deposition operations should be construed broadly as including all types and variants of solid state deposition.

Applications involving FSW and/or solid state deposition (e.g., cold spray) may be used in electronic devices. For example, friction stir welding may be used to join two portions of an enclosure (or case) of the electronic device. Also, cold spray may be used to give a portion of the enclosure or case a certain desired visual effect (e.g., coloration, reflectivity).

Figure 14:
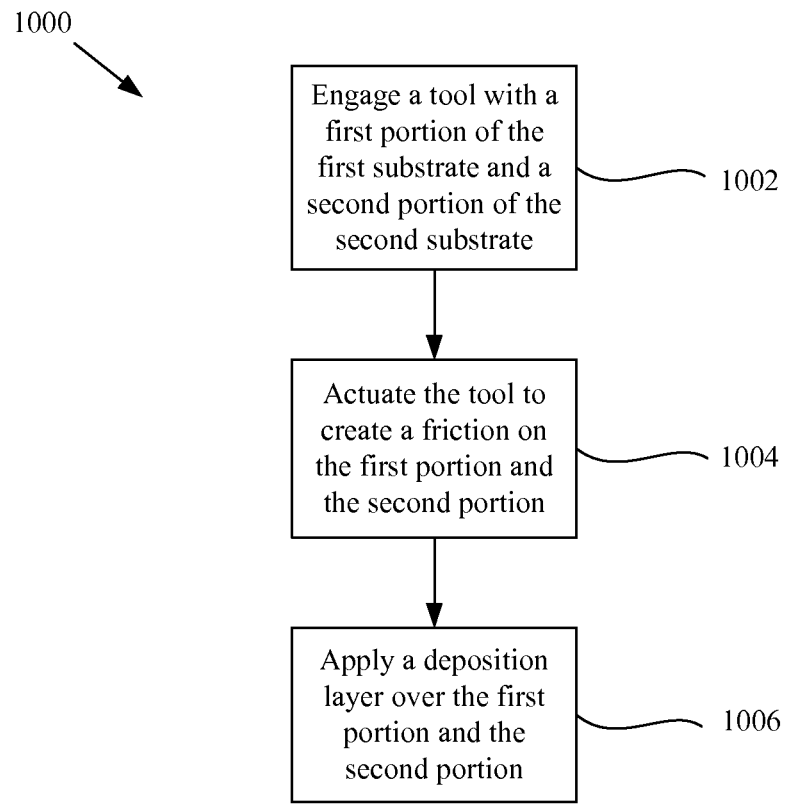
FIG. 14 is a flowchart illustrating of a method of joining and covering a first substrate and a second substrate, in accordance with the described embodiments.

FIG. 14 illustrates a flow chart 1000 describing a method of joining and covering a first substrate and a second substrate. In step 1002, a tool engages a first portion of the first substrate and a second portion of the second substrate. In some embodiments, the tool is a rotational tool described in FIG. 5A. Also, in some embodiments, the first substrate and the second substrate are the substrates described in FIG. 5A. Then in step 1004, the tool is actuated to create a friction on the first portion and the second portion. In some embodiments, the friction is capable of joining the first portion and the second portion to form a joined portion. Friction from the FSW process previously described is configured to create the necessary friction. Then in step 1006, a deposition layer is applied over the first portion and the second portion. The deposition layer includes several particles formed from a metallic material. In some embodiments, the deposition layer is applied using the solid state deposition (e.g., cold spray) process previously described. Also, in some embodiments, the plurality of particles may include different kinetic energies. Further, the plurality of particles may be disposed on the first substrate and the second substrate, and in some cases a channel, such that the plurality of particles includes a color and/or reflectivity similar to that of the first substrate and the second substrate. Also, a portion of the deposition layer may be removed by a removal process previously described (e.g., etching, feathering, anodizing).

Figure 15:
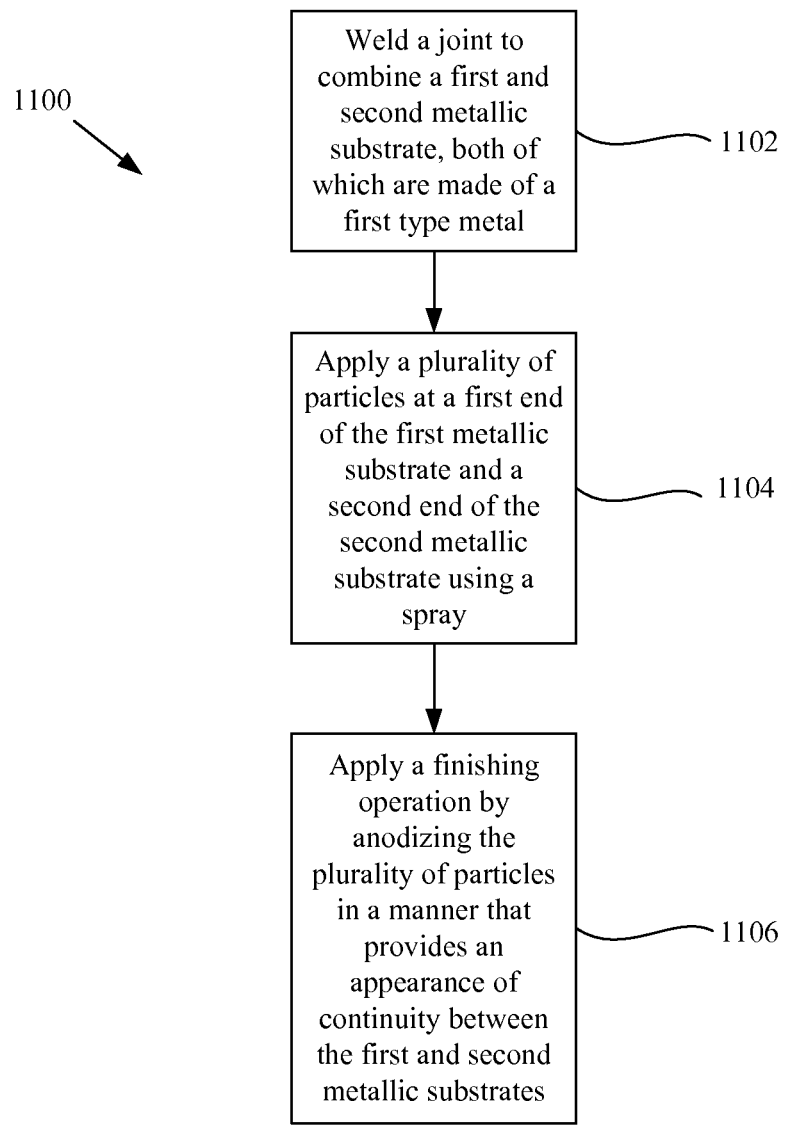
FIG. 15 is a flowchart illustrating a method for enhancing an appearance of a joint between a first and second metallic substrate, in accordance with the described embodiments.

FIG. 15 illustrates a flowchart 1100 describing a method for enhancing an appearance of a joint between a first and second metallic substrate. In step 1102, a welding process is used to form the joint of a first type metal between the first and second metallic substrates. The welding process may include the FSW process previously described. In some embodiments, the bulk material is aluminum. The aluminum can include an AA 6063 aluminum alloy. In step 1104, a plurality of particles is applied at a first end of the first metallic substrate and a second end of the second metallic substrate using a spray. In some embodiments, the spray is a solid state deposition (e.g., cold spray). In some embodiments, the first and second metallic substrates are formed substantially from the first type metal. Also, in some embodiments, the plurality of particles may be emitted from a structure (e.g., chamber) in a particle-gas mixture such that the plurality of particles includes, for example, a first average kinetic energy and a second average kinetic energy. Then in step 1106, subsequent to applying the plurality of particles, a finishing operation is applied by anodizing the plurality of particles in a manner that provides an appearance of continuity between the first and second metallic substrates. The anodizing may remove a portion of the plurality of particles. However, it should be understood that the anodizing will not remove the plurality of particles such that the joint is visible.

Figure 16:
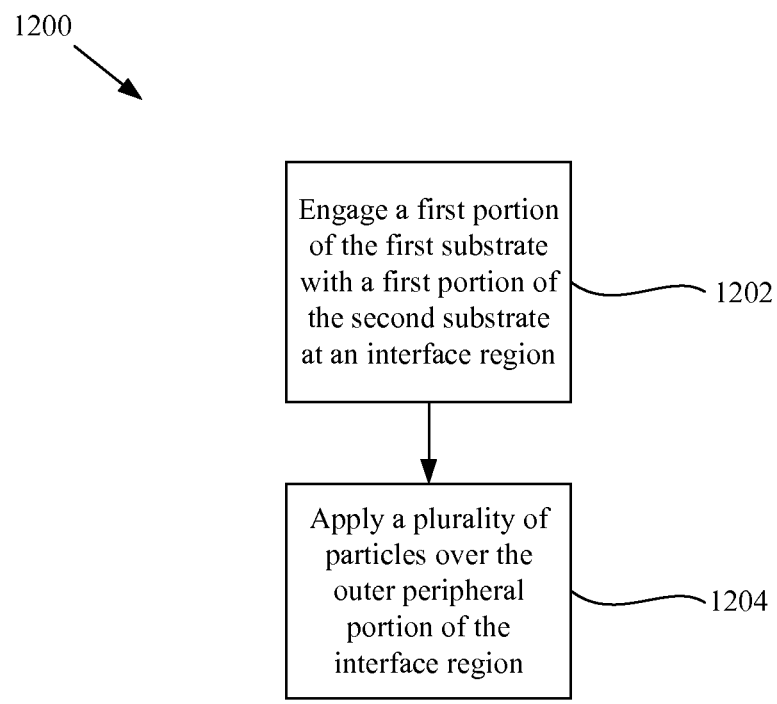
FIG. 16 is a flowchart illustrating a method using a plurality of particles to form a joint to combine a first substrate with a second substrate, in accordance with the described embodiments.

FIG. 16 illustrates a flowchart 1200 describing a method for using a plurality of particles to form a joint to combine a first substrate with a second substrate. In step 1202, a first portion of the first substrate is engaged with a first portion of the second substrate at an interface region. The interface region includes an outer peripheral portion. The interface region generally represents an area where the first and second portions are connected. Also, the interface region includes an outer peripheral portion that extends along the outer regions where first and second substrates are engaged. Then in step 1204, a plurality of particles is applied over the outer peripheral portion of the interface region. The plurality of particles is formed from a material such that the plurality of particles deform upon impact proximate to the outer peripheral portion of the interface region. In some embodiments, the application process includes solid state deposition (e.g., cold spray). Also, in some embodiments the thickness may be gradually reduces thereby blending the plurality of particles with the first and second substrates. This process allows the plurality of particles to have a similar color and/or reflectivity as that of the first and second substrates.

Figure 17:
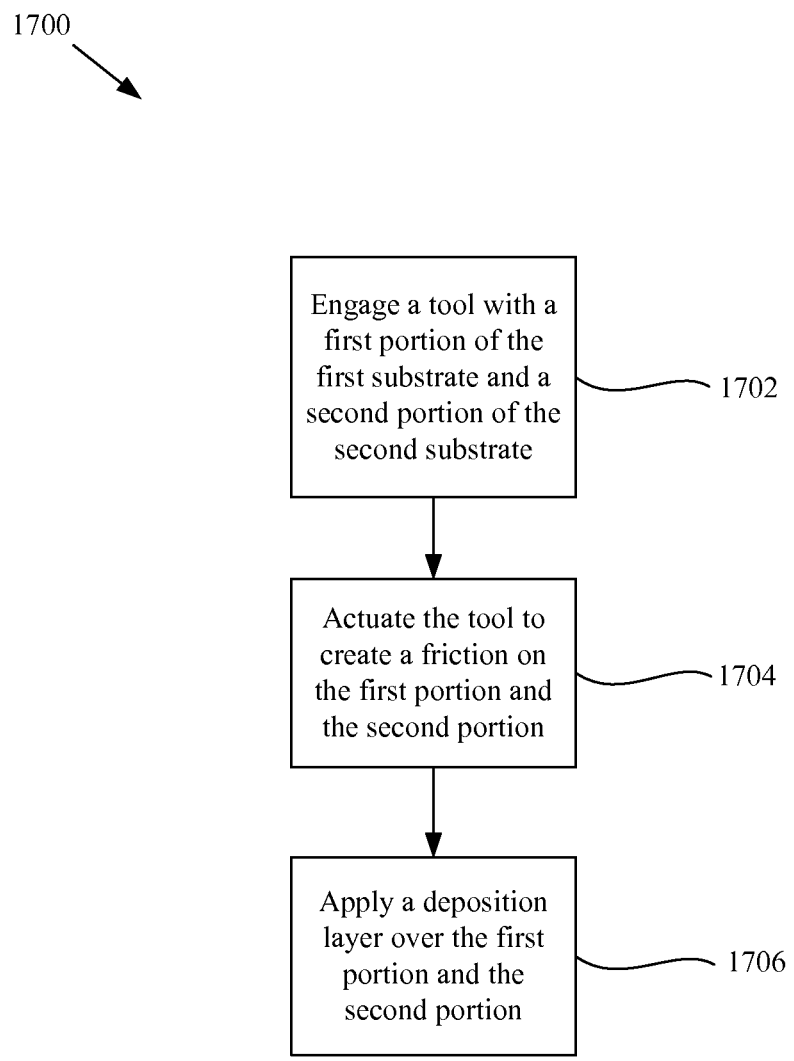
FIG. 17 is a flowchart illustrating a method of joining and covering a first substrate and a second substrate, in accordance with the described embodiments.

FIG. 17 illustrates a flowchart 1700 showing a method of joining and covering a first substrate and a second substrate. At step 1702, a tool engages a first portion of the first substrate and a second portion of the second substrate. In some embodiments, the tool is a rotational tool previously described. Also, the tool is configured to create FSW in order to join the first substrate and the second substrate. Then at step 1704, the tool is actuated to create a friction on the first portion and the second portion. The friction may be capable of joining the first portion and the second portion to form a joined portion (e.g., using FSW). Then at step 1706, a deposition layer is applied over the first portion and the second portion. In some embodiments, deposition layer having several particles formed from a metallic material. In some embodiments, the deposition layer is deposited using a cold spray operation previously described. For example, the particles may be combined with pressurized gas in a chamber. This causes the particles to emit from a nozzle of the chamber at high speeds corresponding to an average kinetic energy. In some embodiments, the particles include a first group of particles having a first average kinetic energy and a second group of particles having second average kinetic energy. In some embodiments, the first group of particles includes a different reflectivity than that of the second group of particles. However, when combined, the first group of particles and the second group of particles have a color and/or reflectivity similar to the first substrate and the second substrate. Also, in some embodiments, a finishing may be performed on the deposition layer. For example, the deposition layer may be anodized or etched. Also, in some embodiments, the deposition layer is configured to cover a welded portion. In other embodiments, the deposition layer covers an entire top surface of the first substrate and the second substrate. In this manner, the color and/or reflectivity does not need to be blended or matched with the underlying first and second substrates.

Figure 18:
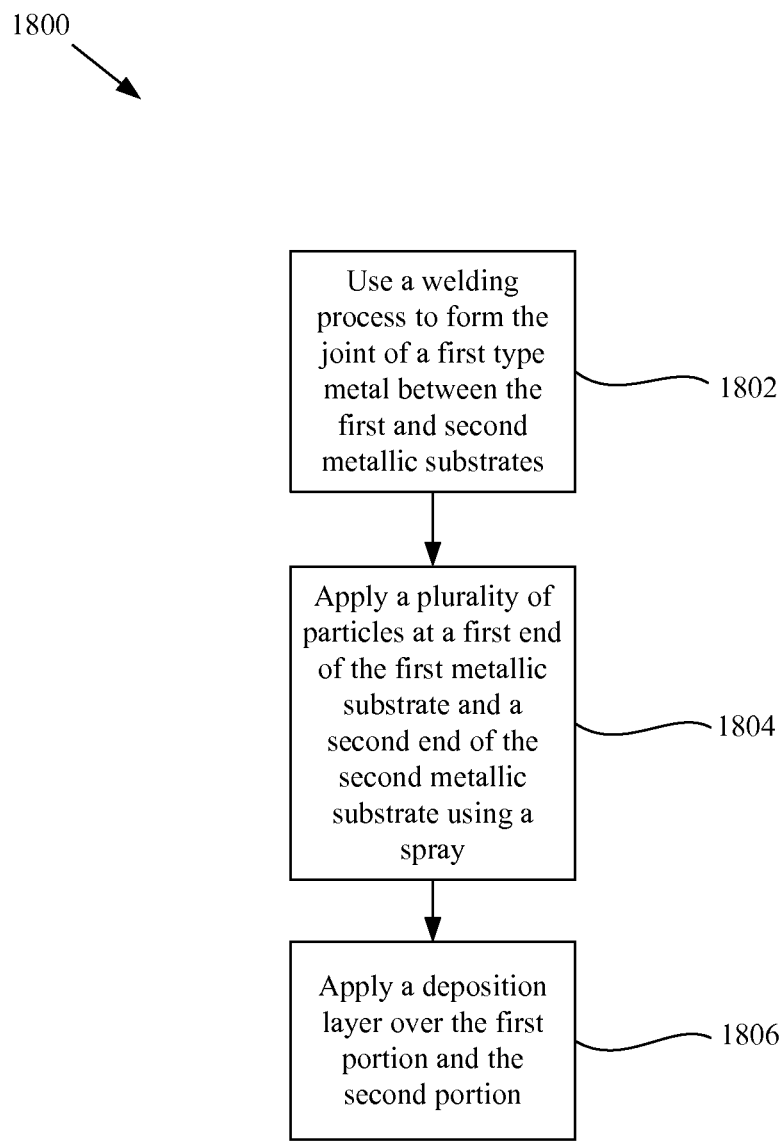
FIG. 18 is a flowchart illustrating of a method for enhancing an appearance of a joint between a first and second metallic substrate, the joint creating a bulk material from the first and second metallic substrate, in accordance with the described embodiments.

FIG. 18 illustrates a flowchart 1800 for enhancing an appearance of a joint between a first and second metallic substrate, the joint creating a bulk material from the first and second metallic substrate. In step 1802, a welding process is used to form the joint of a first type metal between the first and second metallic substrates. In some embodiments, the first type metal is aluminum. Also, in some embodiments, the welding process includes a FSW process previously described. Then in step 1804, several particles are applied at a first end of the first metallic substrate and at a second end of the second metallic substrate using a spray. The first and second metallic substrates are formed substantially from the first type metal. In some embodiments, cold spray operation previously described is configured to apply the several particles of the spray. In some embodiments, the cold spray operation is configured to form a first sub-layer and a second sub-layer onto the bulk material. The first sub-layer includes particles having a first average kinetic energy when being sprayed, and the second sub-layer includes particles having a second average kinetic energy when being sprayed. The first average kinetic energy and the second average kinetic energy may be different. For example, the second average kinetic energy may be less than the first average kinetic energy. Then in step 1806, subsequent to applying the several particles, applying a finishing operation is performed. The finishing operation includes anodizing the several particles in a manner that provides an appearance of continuity between the first and second metallic substrates. For example, the anodization step may configure the several particles to have an appearance (e.g., color, reflectivity) similar to that of the first and second metallic substrates.

Figure 19:
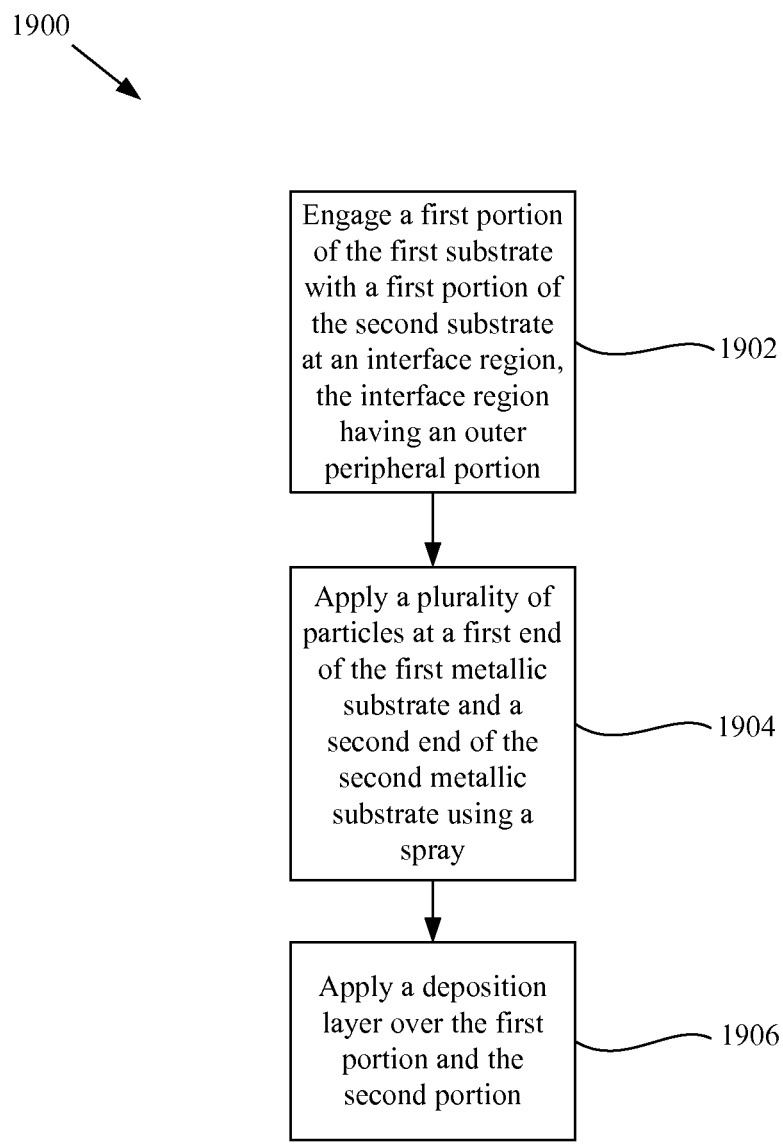
FIG. 19 is a flowchart illustrating of a method for using several particles to form a joint to combine a first substrate with a second substrate, in accordance with the described embodiments.

FIG. 19 illustrates a flowchart 1900 for using several particles to form a joint to combine a first substrate with a second substrate. In step 1902, a first portion of the first substrate is engaged with a first portion of the second substrate at an interface region. The interface region has an outer peripheral portion. Then in step 1904, several particles are applied over the outer peripheral portion of the interface region, the plurality of particles formed from a material such that the plurality of particles deform upon impact proximate to the outer peripheral portion of the interface region. The several particles deposited on the outer peripheral portion are tapered. For example, the particles have a first thickness in a location generally over the joint. The particles taper to a second thickness in an area away from the joint; the second thickness is less than the first thickness. The particles may form, for example, a ramp profile from the first thickness to the second thickness. Also, when the several particles are deposited on the first and second substrates, the several particles may have a similar color and/or reflectivity as the first and second substrates.

Figure 20:
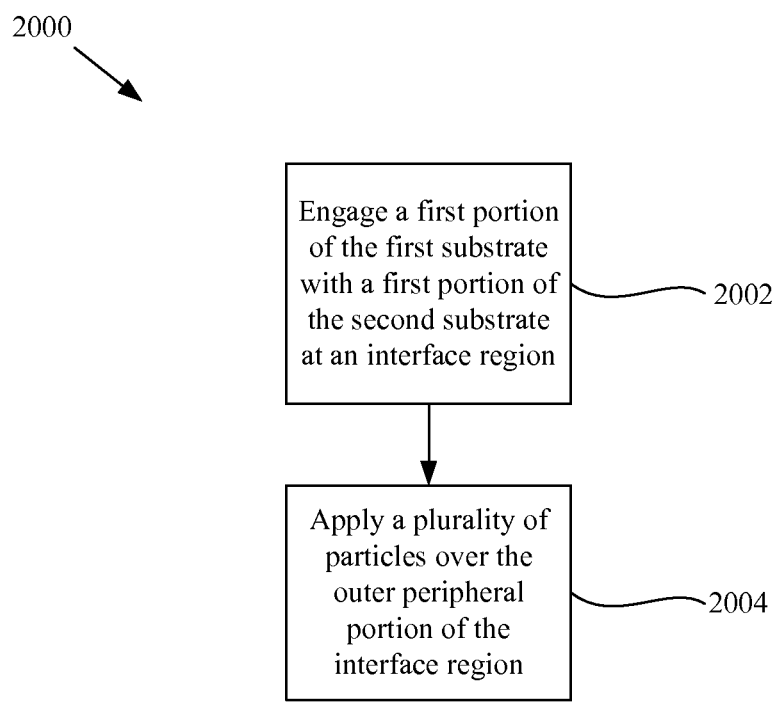
FIG. 20 is a flowchart illustrating of a method for enhancing an appearance of a joint between a first and a second metallic substrate, in accordance with the described embodiments.

FIG. 20 illustrates a flowchart 2000 showing a method for enhancing an appearance of a joint between a first and a second metallic substrate. In step 2002, the joint is formed having a first type metal. The joint is formed between the first metallic substrate and second metallic substrate by applying several particles at a first end of the first substrate and a second end of the second substrate. The first and second substrates are formed from the first type metal, which in some embodiments, is aluminum. In some embodiments, the plurality of particles includes a first plurality of particles having a first average kinetic energy and a second plurality of particles having a second average kinetic energy. In some embodiments, the first average kinetic energy is greater than the second average kinetic energy. Also, in some embodiments, the several particles may include a first and second thickness previously described, along with a tapered configuration previously described. Then in step 2004, subsequent to the forming of the joint, a finishing operation is applied to the joint in a manner that provides an appearance of continuity between the first and second metallic substrates. The finishing operation may include, for example, anodizing the several particles.

Figure 21:
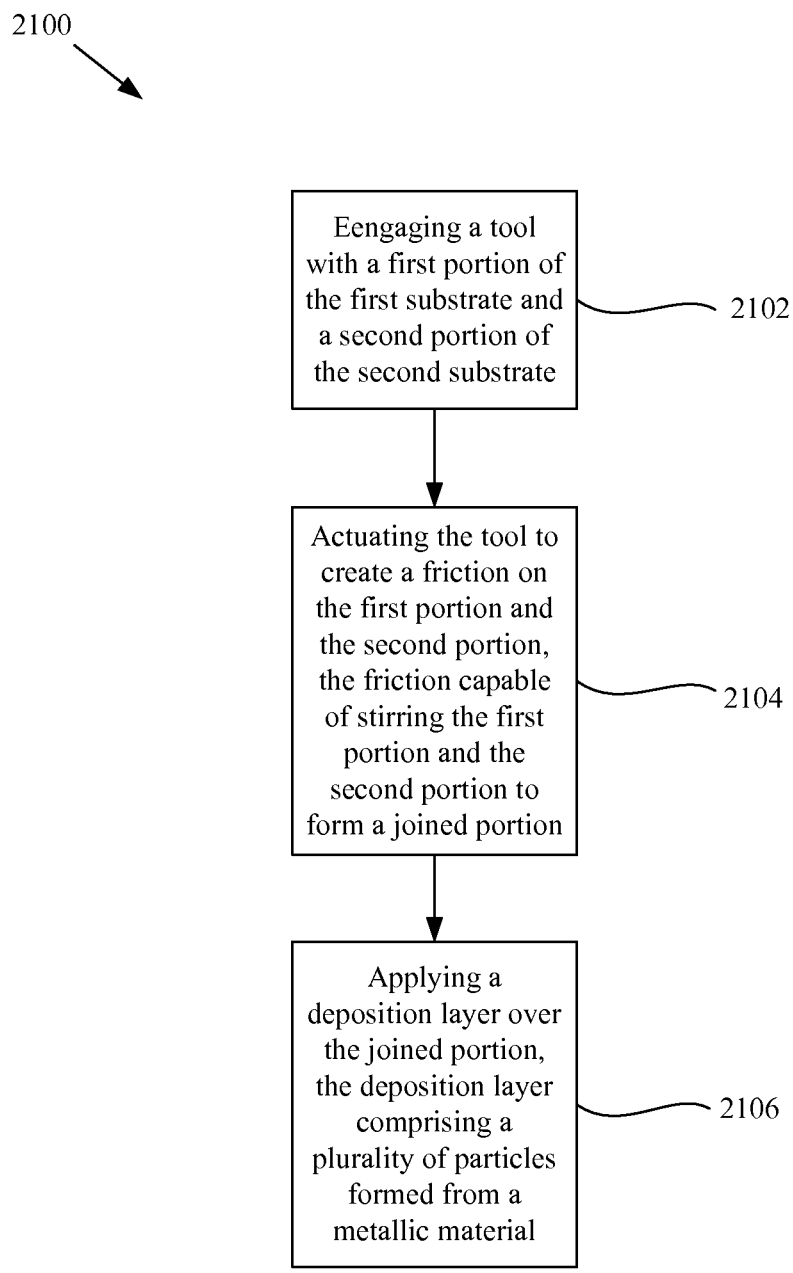
FIG. 21 is a flowchart of a joined first substrate and a second substrate, joined by a process.

FIG. 21 illustrates a flowchart 2100 a joined first substrate and a second substrate, joined by a process. As shown in step 2102, a tool engages a first portion of the first substrate and a second portion of the second substrate. As shown in step 2104, the tool is actuated to create a friction on the first portion and the second portion. The friction capable of stirring the first portion and the second portion to form a joined portion. In some embodiments, the friction includes a FSW process previously described. Then in step 2106, a deposition layer is applied over the joined portion. The deposition layer includes several particles formed from a metallic material. In some embodiments, the metallic material is aluminum. In some embodiments, the several particles deform upon impact with the first and second substrates, or upon impact with other particles. Also, in some embodiments, prior to applying the deposition layer, but subsequent to actuating the tool, an operation may be performed on the first and second substrates. For example, the operation may include sanding, sandblasting, or polishing. The operations are configured to, for example, remove bumps or burrs formed from the FSW process. Also, in some embodiments, applying the deposition layers includes a solid state deposition process (e.g., cold spray).

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method using a plurality of particles to form a joint that combines a first substrate with a second substrate, the method comprising:
    friction stir welding the first substrate with the second substrate at an interface region, the friction stir welding forming a weld line within the interface region;
    machining a channel in the interface region that includes the weld line and that extends into the first and second substrates; and
    applying a plurality of particles to form a coating that fills the channel, the plurality of particles formed from a material such that the plurality of particles deform upon impact.

2. The method as recited in claim 1, wherein the first substrate includes an inclined surface, and wherein the second substrate includes an inclined surface.

3. The method as recited in claim 1, further comprising forming a groove at the interface region.

4. The method as recited in claim 1, further comprising applying a finishing operation comprising anodizing the plurality of particles.

5. The method as recited in claim 1, wherein the plurality of particles tapers from the first thickness to the second thickness.

6. The method as recited in claim 1, wherein applying the plurality of particles comprises depositing the plurality of particles via a solid state deposition.

7. The method as recited in claim 6, wherein depositing the plurality of particles includes a cold spray operation.

8. The method as recited in claim 1, wherein the plurality of particles includes aluminum.

9. The method as recited in claim 1, the first substrate having a color and reflectivity, wherein the first substrate and the second substrate are engaged in a coplanar arrangement.

10. The method as recited in claim 1, wherein:
    the first substrate, the second substrate, and the plurality of particles are formed from a first type metal;
    the coating has a color and reflectivity that are the same as the color and reflectivity of the first substrate;
    the coating extends from an outer peripheral portion of the interface region to an outer peripheral portion of the first substrate;
    the coating includes a first thickness proximate to the joint; and the coating includes a second thickness proximate to an outer peripheral portion of the first substrate other than the joint, the second thickness less than the first thickness.

11. A joint for holding together a first substrate and a second substrate, comprising:
   a friction stir welded region that holds together the first substrate and the second substrate in a coplanar arrangement;
   a channel positioned within a portion of the first substrate and a portion of the second substrate at the friction stir welded region, the channel having a width that is greater than the width of the friction stir welded region and a depth that is less than the depth of the friction stir welded region; and
   a layer covering the friction stir welded region and the entire channel, the layer enhancing an appearance of the joint, wherein the layer comprises a plurality of metallic particles having a color and a reflectivity that are the same as the color and reflectivity of the first substrate and the second substrate.

12. The joint as recited in claim 11, wherein the layer covers a top surface of the first substrate and a top surface of the second substrate.

13. The joint as recited in claim 11, wherein the layer is tapered to form a first thickness and a second thickness, the second thickness less than the first thickness.

14. The joint as recited in claim 11, wherein the plurality of metallic particles is formed from a first type material, and wherein the first substrate and the second substrate are formed from the first type material.

15. The joint as recited in claim 11, wherein the layer covers the friction stir welded region.

16. The joint as recited in claim 15, wherein the layer covers the first substrate and the second substrate.

17. A method of forming a joint combining a first metal substrate with a second metal substrate, the method comprising:
   friction stir welding the first metal substrate to the second metal substrate at an interface region while the first metal substrate and the second metal substrate are in a coplanar arrangement, wherein the friction stir welding forms a weld within the interface region, wherein the first metal substrate has a first color and reflectivity and the second metal substrate has a second color and reflectivity different from the first color and reflectivity;
   forming a channel within the interface region that at least covers the weld; and
   cold spraying a plurality of metal particles over the interface region in a feathering pattern defined by a gradually decreasing density of particles, wherein the feathering pattern fills the channel and provides a gradual fading thereacross from the first color and reflectivity at the first metal substrate to the second color and reflectivity at the second metal substrate.

18. The method as recited in claim 17, further comprising:
   anodizing the top surfaces of the first metal substrate, the second metal substrate, and the feathering pattern.

* * * * *

UNITED STATES PATENT AND TRADEMARK OFFICE
CERTIFICATE OF CORRECTION

| | |
|---|---|
| PATENT NO. | : 9,611,562 B2 |
| APPLICATION NO. | : 14/277528 |
| DATED | : April 4, 2017 |
| INVENTOR(S) | : Lancaster-Larocque et al. |

It is certified that error appears in the above-identified patent and that said Letters Patent is hereby corrected as shown below:

In Claim 1, Column 16, Line 33: "applying a plurality" should read -- applying the plurality --.

In Claim 5, Column 16, Lines 46-47: "from the first thickness to the second thickness" should read -- from a first thickness to a second thickness --.

In Claim 9, Column 16, Lines 55-56: "the first substrate having a color and reflectivity, wherein" should read -- wherein the first substrate has a color and reflectivity, and wherein --.

In Claim 10, Column 17, Lines 1-3: "an outer peripheral portion of the first substrate other than the joint, the second thickness less than" should read -- the outer peripheral portion of the first substrate other than the joint, wherein the second thickness is less than --.

In Claim 11, Column 17, Lines 13-14: "the width of the friction stir welded region and a depth that is less than the depth" should read -- a width of the friction stir welded region and a depth that is less than a depth --.

In Claim 11, Column 17, Line 20: "the color" should read -- a color --.

In Claim 17, Column 18, Line 22: insert -- the plurality of metal -- after the phrase "decreasing density of".

In Claim 18, Column 18, Line 28: "anodizing the top" should read -- anodizing top --.

Signed and Sealed this
Twenty-first Day of November, 2017

Joseph Matal
*Performing the Functions and Duties of the
Under Secretary of Commerce for Intellectual Property and
Director of the United States Patent and Trademark Office*